United States Patent
Gupta et al.

(10) Patent No.: US 12,381,878 B1
(45) Date of Patent: Aug. 5, 2025

(54) ARCHITECTURE FOR SELECTIVE USE OF PRIVATE PATHS BETWEEN CLOUD SERVICES

(71) Applicant: Amazon Technologies, Inc., Seattle, WA (US)

(72) Inventors: Kshitij Gupta, Seattle, WA (US); Prashant Kumar Singh, Seattle, WA (US); Robert Laks, Seattle, WA (US); Ravi S Nagayach, Aurora, IL (US); Dharani Sankar Vijayakumar, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 220 days.

(21) Appl. No.: 18/342,624

(22) Filed: Jun. 27, 2023

(51) Int. Cl.
*H04L 61/4511* (2022.01)
*H04L 9/40* (2022.01)

(52) U.S. Cl.
CPC .......... *H04L 63/10* (2013.01); *H04L 61/4511* (2022.05); *H04L 63/101* (2013.01); *H04L 63/108* (2013.01); *H04L 63/126* (2013.01)

(58) Field of Classification Search
CPC ..... H04L 63/10; H04L 63/101; H04L 63/102; H04L 63/105; H04L 63/107;
(Continued)

(56) References Cited

U.S. PATENT DOCUMENTS 4,949,254 A    8/1990   Shorter
5,283,888 A    2/1994   Dao et al.
(Continued)

FOREIGN PATENT DOCUMENTS

CA    2975522 A1    8/2016
CN    1341238 A    3/2002
(Continued)

OTHER PUBLICATIONS

Anonymous: "Amazon Elastic Compute Cloud User Guide for Linux Instances—first 400 pages of 795," Apr. 8, 2016 (Apr. 8, 2016_, XP055946665, Retrieved from the Internet: URL:https://web.archive.org/web/20160408211543if_/http://docs.aws.amazon.com/AWSEC2/latest/UserGuide/ec2-ug.pdf (retrieved on Jul. 27, 2022] 795 pages.
(Continued)

*Primary Examiner* — Khanh Q Dinh
(74) *Attorney, Agent, or Firm* — Knobbe, Martens, Olson & Bear, LLP

(57) ABSTRACT

Systems and methods are provided for allowing function-initiated traffic of an on-demand code execution system within a cloud provider network to be routed to a private path such based on opt-in settings. An opt-in request may be received indicating a desire of a function invoker to use a private path. Subsequent to the opt-in request, a function invocation request may be received to send communication to a service within the cloud provider network and external to the on-demand code execution system. Subsequent to the function invocation request, a virtual execution environment may be configured to execute the function with mapping of a network-based service to an IP address of a private endpoint. The function is then executed with its traffic sent to the private endpoint.

20 Claims, 5 Drawing Sheets

(58) Field of Classification Search
CPC ... H04L 63/108; H04L 63/123; H04L 63/126; H04L 63/145; H04L 63/1425
USPC .......................................... 709/220, 224–228
See application file for complete search history.

(56) References Cited

U.S. PATENT DOCUMENTS

| | | | |
|---|---|---|---|
| 5,835,764 | A | 11/1998 | Platt et al. |
| 5,970,488 | A | 10/1999 | Crowe et al. |
| 5,983,197 | A | 11/1999 | Enta |
| 6,237,005 | B1 | 5/2001 | Griffin |
| 6,260,058 | B1 | 7/2001 | Hoenninger et al. |
| 6,385,636 | B1 | 5/2002 | Suzuki |
| 6,463,509 | B1 | 10/2002 | Teoman et al. |
| 6,501,736 | B1 | 12/2002 | Smolik et al. |
| 6,523,035 | B1 | 2/2003 | Fleming et al. |
| 6,549,936 | B1 | 4/2003 | Hirabayashi |
| 6,708,276 | B1 | 3/2004 | Yarsa et al. |
| 7,036,121 | B1 | 4/2006 | Casabona et al. |
| 7,308,463 | B2 | 12/2007 | Taulbee et al. |
| 7,340,522 | B1 | 3/2008 | Basu et al. |
| 7,360,215 | B2 | 4/2008 | Kraiss et al. |
| 7,558,719 | B1 | 7/2009 | Donlin |
| 7,577,722 | B1 | 8/2009 | Khandekar et al. |
| 7,590,806 | B2 | 9/2009 | Harris et al. |
| 7,640,574 | B1 | 12/2009 | Kim et al. |
| 7,665,090 | B1 | 2/2010 | Tormasov et al. |
| 7,707,579 | B2 | 4/2010 | Rodriguez |
| 7,730,464 | B2 | 6/2010 | Trowbridge |
| 7,774,191 | B2 | 8/2010 | Berkowitz et al. |
| 7,823,186 | B2 | 10/2010 | Pouliot |
| 7,831,464 | B1 | 11/2010 | Nichols et al. |
| 7,870,153 | B2 | 1/2011 | Croft et al. |
| 7,886,021 | B2 | 2/2011 | Scheifler et al. |
| 7,949,677 | B2 | 5/2011 | Croft et al. |
| 7,954,150 | B2 | 5/2011 | Croft et al. |
| 8,010,679 | B2 | 8/2011 | Low et al. |
| 8,010,990 | B2 | 8/2011 | Ferguson et al. |
| 8,024,564 | B2 | 9/2011 | Bassani et al. |
| 8,046,765 | B2 | 10/2011 | Cherkasova et al. |
| 8,051,180 | B2 | 11/2011 | Mazzaferri et al. |
| 8,051,266 | B2 | 11/2011 | DeVal et al. |
| 8,065,676 | B1 | 11/2011 | Sahai et al. |
| 8,065,682 | B2 | 11/2011 | Baryshnikov et al. |
| 8,095,931 | B1 | 1/2012 | Chen et al. |
| 8,127,284 | B2 | 2/2012 | Meijer et al. |
| 8,146,073 | B2 | 3/2012 | Sinha |
| 8,166,304 | B2 | 4/2012 | Murase et al. |
| 8,171,473 | B2 | 5/2012 | Lavin |
| 8,201,026 | B1 | 6/2012 | Bornstein et al. |
| 8,209,695 | B1 | 6/2012 | Pruyne et al. |
| 8,219,987 | B1 | 7/2012 | Vlaovic et al. |
| 8,296,267 | B2 | 10/2012 | Cahill et al. |
| 8,321,554 | B2 | 11/2012 | Dickinson |
| 8,321,558 | B1 | 11/2012 | Sirota et al. |
| 8,336,079 | B2 | 12/2012 | Budko et al. |
| 8,352,608 | B1 | 1/2013 | Keagy et al. |
| 8,387,075 | B1 | 2/2013 | McCann et al. |
| 8,392,558 | B1 | 3/2013 | Ahuja et al. |
| 8,402,514 | B1 | 3/2013 | Thompson et al. |
| 8,417,723 | B1 | 4/2013 | Lissack et al. |
| 8,429,282 | B1 | 4/2013 | Ahuja |
| 8,448,165 | B1 | 5/2013 | Conover |
| 8,479,195 | B2 | 7/2013 | Adams et al. |
| 8,490,088 | B2 | 7/2013 | Tang |
| 8,555,281 | B1 | 10/2013 | Van Dijk et al. |
| 8,560,699 | B1 | 10/2013 | Theimer et al. |
| 8,566,835 | B2 | 10/2013 | Wang et al. |
| 8,601,323 | B2 | 12/2013 | Tsantilis |
| 8,613,070 | B1 | 12/2013 | Borzycki et al. |
| 8,615,589 | B1 | 12/2013 | Adogla et al. |
| 8,631,130 | B2 | 1/2014 | Jackson |
| 8,667,471 | B2 | 3/2014 | Wintergerst et al. |
| 8,677,359 | B1 | 3/2014 | Cavage et al. |
| 8,694,996 | B2 | 4/2014 | Cawlfield et al. |
| 8,700,768 | B2 | 4/2014 | Benari |
| 8,713,093 | B1 | 4/2014 | Upadhyay et al. |
| 8,719,415 | B1 | 5/2014 | Sirota et al. |
| 8,725,702 | B1 | 5/2014 | Raman et al. |
| 8,756,322 | B1 | 6/2014 | Lynch |
| 8,756,696 | B1 | 6/2014 | Miller |
| 8,763,091 | B1 | 6/2014 | Singh et al. |
| 8,769,519 | B2 | 7/2014 | Leitman et al. |
| 8,793,676 | B2 | 7/2014 | Quinn et al. |
| 8,799,236 | B1 | 8/2014 | Azari et al. |
| 8,799,879 | B2 | 8/2014 | Wright et al. |
| 8,806,266 | B1 | 8/2014 | Qu et al. |
| 8,806,468 | B2 | 8/2014 | Meijer et al. |
| 8,806,644 | B1 | 8/2014 | McCorkendale et al. |
| 8,819,679 | B2 | 8/2014 | Agarwal et al. |
| 8,825,863 | B2 | 9/2014 | Hansson et al. |
| 8,825,964 | B1 | 9/2014 | Sopka et al. |
| 8,839,035 | B1 | 9/2014 | Dimitrovich et al. |
| 8,850,432 | B2 | 9/2014 | Mcgrath et al. |
| 8,869,300 | B2 | 10/2014 | Singh et al. |
| 8,874,952 | B2 | 10/2014 | Tameshige et al. |
| 8,904,008 | B2 | 12/2014 | Calder et al. |
| 8,949,457 | B1 | 2/2015 | Theroux et al. |
| 8,966,495 | B2 | 2/2015 | Kulkarni |
| 8,972,980 | B2 | 3/2015 | Banga et al. |
| 8,990,807 | B2 | 3/2015 | Wu et al. |
| 8,997,093 | B2 | 3/2015 | Dimitrov |
| 9,002,871 | B2 | 4/2015 | Bulkowski et al. |
| 9,021,501 | B2 | 4/2015 | Li et al. |
| 9,026,658 | B2 | 5/2015 | Xu et al. |
| 9,027,087 | B2 | 5/2015 | Ishaya et al. |
| 9,038,068 | B2 | 5/2015 | Engle et al. |
| 9,052,935 | B1 | 6/2015 | Rajaa |
| 9,086,897 | B2 | 7/2015 | Oh et al. |
| 9,086,924 | B2 | 7/2015 | Barsness et al. |
| 9,092,837 | B2 | 7/2015 | Bala et al. |
| 9,098,528 | B2 | 8/2015 | Wang |
| 9,104,477 | B2 | 8/2015 | Kodialam et al. |
| 9,110,732 | B1 | 8/2015 | Forschmiedt et al. |
| 9,110,770 | B1 | 8/2015 | Raju et al. |
| 9,111,037 | B1 | 8/2015 | Nalis et al. |
| 9,112,813 | B2 | 8/2015 | Jackson |
| 9,116,733 | B2 | 8/2015 | Banga et al. |
| 9,130,900 | B2 | 9/2015 | Tran |
| 9,141,410 | B2 | 9/2015 | Leafe et al. |
| 9,146,764 | B1 | 9/2015 | Wagner |
| 9,152,406 | B2 | 10/2015 | De et al. |
| 9,154,955 | B1 | 10/2015 | Bertz et al. |
| 9,164,754 | B1 | 10/2015 | Pohlack |
| 9,176,871 | B1 | 11/2015 | Serlet |
| 9,183,019 | B2 | 11/2015 | Kruglick |
| 9,189,778 | B1 | 11/2015 | Sh. Al-Rashidi |
| 9,195,520 | B2 | 11/2015 | Turk |
| 9,208,007 | B2 | 12/2015 | Harper et al. |
| 9,218,190 | B2 | 12/2015 | Anand et al. |
| 9,223,561 | B2 | 12/2015 | Orveillon et al. |
| 9,223,966 | B1 | 12/2015 | Satish et al. |
| 9,250,893 | B2 | 2/2016 | Blahaerath et al. |
| 9,268,586 | B2 | 2/2016 | Voccio et al. |
| 9,298,633 | B1 | 3/2016 | Zhao et al. |
| 9,317,689 | B2 | 4/2016 | Aissi |
| 9,323,556 | B2 | 4/2016 | Wagner |
| 9,361,145 | B1 | 6/2016 | Wilson et al. |
| 9,405,582 | B2 | 8/2016 | Fuller et al. |
| 9,411,645 | B1 | 8/2016 | Duan et al. |
| 9,413,626 | B2 | 8/2016 | Reque et al. |
| 9,417,918 | B2 | 8/2016 | Chin et al. |
| 9,430,290 | B1 | 8/2016 | Gupta et al. |
| 9,436,555 | B2 | 9/2016 | Dornemann et al. |
| 9,461,996 | B2 | 10/2016 | Hayton et al. |
| 9,471,775 | B1 | 10/2016 | Wagner et al. |
| 9,471,776 | B2 | 10/2016 | Gu et al. |
| 9,483,335 | B1 | 11/2016 | Wagner et al. |
| 9,489,227 | B2 | 11/2016 | Oh et al. |
| 9,497,136 | B1 | 11/2016 | Ramarao et al. |
| 9,501,345 | B1 | 11/2016 | Lietz et al. |
| 9,514,037 | B1 | 12/2016 | Dow et al. |
| 9,537,788 | B2 | 1/2017 | Reque et al. |
| 9,563,613 | B1 | 2/2017 | Dinkel et al. |

(56) References Cited

U.S. PATENT DOCUMENTS

| | | | |
|---|---|---|---|
| 9,565,190 B1 | 2/2017 | Telvik et al. |
| 9,575,798 B2 | 2/2017 | Terayama et al. |
| 9,588,790 B1 | 3/2017 | Wagner et al. |
| 9,594,590 B2 | 3/2017 | Hsu |
| 9,596,350 B1 | 3/2017 | Dymshyts et al. |
| 9,600,312 B2 | 3/2017 | Wagner et al. |
| 9,613,127 B1 | 4/2017 | Rus et al. |
| 9,626,204 B1 | 4/2017 | Banga et al. |
| 9,628,332 B2 | 4/2017 | Bruno, Jr. et al. |
| 9,635,132 B1 | 4/2017 | Lin et al. |
| 9,652,306 B1 | 5/2017 | Wagner et al. |
| 9,652,617 B1 | 5/2017 | Evans et al. |
| 9,654,508 B2 | 5/2017 | Barton et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,703,681 B2 | 7/2017 | Taylor et al. |
| 9,715,402 B2 | 7/2017 | Wagner et al. |
| 9,720,661 B2 | 8/2017 | Gschwind et al. |
| 9,720,662 B2 | 8/2017 | Gschwind et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,760,443 B2 | 9/2017 | Tarasuk-Levin et al. |
| 9,767,271 B2 | 9/2017 | Ghose |
| 9,785,476 B2 | 10/2017 | Wagner et al. |
| 9,787,779 B2 | 10/2017 | Frank et al. |
| 9,798,831 B2 | 10/2017 | Chattopadhyay et al. |
| 9,799,017 B1 | 10/2017 | Vermeulen et al. |
| 9,811,363 B1 | 11/2017 | Wagner |
| 9,811,434 B1 | 11/2017 | Wagner |
| 9,817,695 B2 | 11/2017 | Clark |
| 9,830,175 B1 | 11/2017 | Wagner |
| 9,830,193 B1 | 11/2017 | Wagner et al. |
| 9,830,449 B1 | 11/2017 | Wagner |
| 9,864,636 B1 | 1/2018 | Patel et al. |
| 9,898,393 B2 | 2/2018 | Moorthi et al. |
| 9,910,713 B2 | 3/2018 | Wisniewski et al. |
| 9,921,864 B2 | 3/2018 | Singaravelu et al. |
| 9,928,108 B1 | 3/2018 | Wagner et al. |
| 9,929,916 B1 | 3/2018 | Subramanian et al. |
| 9,930,103 B2 | 3/2018 | Thompson |
| 9,930,133 B2 | 3/2018 | Susarla et al. |
| 9,952,896 B2 | 4/2018 | Wagner et al. |
| 9,977,691 B2 | 5/2018 | Marriner et al. |
| 9,979,817 B2 | 5/2018 | Huang et al. |
| 9,983,982 B1 | 5/2018 | Kumar et al. |
| 10,002,026 B1 | 6/2018 | Wagner |
| 10,002,036 B2 | 6/2018 | Fuchs et al. |
| 10,013,267 B1 | 7/2018 | Wagner et al. |
| 10,042,660 B2 | 8/2018 | Wagner et al. |
| 10,048,974 B1 | 8/2018 | Wagner et al. |
| 10,061,613 B1 | 8/2018 | Brooker et al. |
| 10,067,801 B1 | 9/2018 | Wagner |
| 10,102,040 B2 | 10/2018 | Marriner et al. |
| 10,108,443 B2 | 10/2018 | Wagner et al. |
| 10,139,876 B2 | 11/2018 | Lu et al. |
| 10,140,137 B2 | 11/2018 | Wagner |
| 10,146,635 B1 | 12/2018 | Chai et al. |
| 10,162,655 B2 | 12/2018 | Tuch et al. |
| 10,162,672 B2 | 12/2018 | Wagner et al. |
| 10,162,688 B2 | 12/2018 | Wagner |
| 10,191,861 B1 | 1/2019 | Steinberg |
| 10,193,839 B2 | 1/2019 | Tandon et al. |
| 10,198,298 B2 | 2/2019 | Bishop et al. |
| 10,203,990 B2 | 2/2019 | Wagner et al. |
| 10,248,467 B2 | 4/2019 | Wisniewski et al. |
| 10,255,090 B2 | 4/2019 | Tuch et al. |
| 10,277,708 B2 | 4/2019 | Wagner et al. |
| 10,282,229 B2 | 5/2019 | Wagner et al. |
| 10,303,492 B1 | 5/2019 | Wagner et al. |
| 10,331,462 B1 | 6/2019 | Varda et al. |
| 10,346,625 B2 | 7/2019 | Anderson et al. |
| 10,353,678 B1 | 7/2019 | Wagner |
| 10,353,746 B2 | 7/2019 | Reque et al. |
| 10,360,025 B2 | 7/2019 | Foskett et al. |
| 10,360,067 B1 | 7/2019 | Wagner |
| 10,365,985 B2 | 7/2019 | Wagner |
| 10,387,177 B2 | 8/2019 | Wagner et al. |
| 10,402,231 B2 | 9/2019 | Marriner et al. |
| 10,423,158 B1 | 9/2019 | Hadlich |
| 10,437,629 B2 | 10/2019 | Wagner et al. |
| 10,445,140 B1 | 10/2019 | Sagar et al. |
| 10,459,822 B1 | 10/2019 | Gondi |
| 10,496,547 B1 | 12/2019 | Naenko et al. |
| 10,503,626 B2 | 12/2019 | Idicula et al. |
| 10,528,390 B2 | 1/2020 | Brooker et al. |
| 10,531,226 B1 | 1/2020 | Wang et al. |
| 10,552,193 B2 | 2/2020 | Wagner et al. |
| 10,552,442 B1 | 2/2020 | Lusk et al. |
| 10,564,946 B1 | 2/2020 | Wagner et al. |
| 10,572,375 B1 | 2/2020 | Wagner |
| 10,592,269 B2 | 3/2020 | Wagner et al. |
| 10,608,973 B2 | 3/2020 | Kuo et al. |
| 10,615,984 B1 | 4/2020 | Wang |
| 10,623,476 B2 | 4/2020 | Thompson |
| 10,637,817 B2 | 4/2020 | Kuo et al. |
| 10,649,749 B1 | 5/2020 | Brooker et al. |
| 10,649,792 B1 | 5/2020 | Kulchytskyy et al. |
| 10,650,156 B2 | 5/2020 | Anderson et al. |
| 10,652,350 B2 | 5/2020 | Wozniak |
| 10,678,522 B1 | 6/2020 | Yerramreddy et al. |
| 10,686,605 B2 | 6/2020 | Chhabra et al. |
| 10,691,498 B2 | 6/2020 | Wagner |
| 10,713,080 B1 | 7/2020 | Brooker et al. |
| 10,719,367 B1 | 7/2020 | Kim et al. |
| 10,725,752 B1 | 7/2020 | Wagner et al. |
| 10,725,826 B1 | 7/2020 | Sagar et al. |
| 10,732,951 B2 | 8/2020 | Jayanthi et al. |
| 10,733,085 B1 | 8/2020 | Wagner |
| 10,740,149 B2 * | 8/2020 | Bogineni ............... G06F 9/5022 |
| 10,754,701 B1 | 8/2020 | Wagner |
| 10,776,091 B1 | 9/2020 | Wagner et al. |
| 10,776,171 B2 | 9/2020 | Wagner et al. |
| 10,817,331 B2 | 10/2020 | Mullen et al. |
| 10,824,484 B2 | 11/2020 | Wagner et al. |
| 10,831,898 B1 | 11/2020 | Wagner |
| 10,846,117 B1 | 11/2020 | Steinberg |
| 10,853,112 B2 | 12/2020 | Wagner et al. |
| 10,853,115 B2 | 12/2020 | Mullen et al. |
| 10,884,722 B2 | 1/2021 | Brooker et al. |
| 10,884,787 B1 | 1/2021 | Wagner et al. |
| 10,884,802 B2 | 1/2021 | Wagner et al. |
| 10,884,812 B2 | 1/2021 | Brooker et al. |
| 10,891,145 B2 | 1/2021 | Wagner et al. |
| 10,915,371 B2 | 2/2021 | Wagner et al. |
| 10,942,795 B1 | 3/2021 | Yanacek et al. |
| 10,949,237 B2 | 3/2021 | Piwonka et al. |
| 10,956,185 B2 | 3/2021 | Wagner |
| 10,956,244 B1 | 3/2021 | Cho |
| 11,010,188 B1 | 5/2021 | Brooker et al. |
| 11,016,815 B2 | 5/2021 | Wisniewski et al. |
| 11,044,198 B1 | 6/2021 | Ahn et al. |
| 11,082,333 B1 | 8/2021 | Lam et al. |
| 11,099,870 B1 | 8/2021 | Brooker et al. |
| 11,099,917 B2 | 8/2021 | Hussels et al. |
| 11,115,404 B2 | 9/2021 | Siefker et al. |
| 11,119,809 B1 | 9/2021 | Brooker et al. |
| 11,119,813 B1 | 9/2021 | Kasaragod |
| 11,119,826 B2 | 9/2021 | Yanacek et al. |
| 11,126,469 B2 | 9/2021 | Reque et al. |
| 11,132,213 B1 | 9/2021 | Wagner et al. |
| 11,146,569 B1 | 10/2021 | Brooker et al. |
| 11,159,528 B2 | 10/2021 | Siefker et al. |
| 11,188,391 B1 | 11/2021 | Sule |
| 11,190,609 B2 | 11/2021 | Siefker et al. |
| 11,231,955 B1 | 1/2022 | Shahane et al. |
| 11,243,819 B1 | 2/2022 | Wagner |
| 11,243,953 B2 | 2/2022 | Wagner et al. |
| 11,263,034 B2 | 3/2022 | Wagner et al. |
| 11,327,992 B1 | 5/2022 | Batsakis et al. |
| 11,354,169 B2 | 6/2022 | Marriner et al. |
| 11,360,793 B2 | 6/2022 | Wagner et al. |
| 11,392,497 B1 | 7/2022 | Brooker et al. |

(56) References Cited

U.S. PATENT DOCUMENTS

| | | | |
|---|---|---|---|
| 11,394,636 B1 * | 7/2022 | Walker | H04L 47/125 |
| 11,411,771 B1 * | 8/2022 | Dawani | H04L 12/4641 |
| 11,461,124 B2 | 10/2022 | Wagner et al. | |
| 11,467,890 B2 | 10/2022 | Wagner | |
| 11,550,713 B1 | 1/2023 | Piwonka et al. | |
| 11,561,811 B2 | 1/2023 | Wagner | |
| 11,593,270 B1 | 2/2023 | Brooker et al. | |
| 11,656,892 B1 * | 5/2023 | Harris | G06F 16/245 718/1 |
| 11,714,675 B2 | 8/2023 | Brooker et al. | |
| 11,778,053 B1 * | 10/2023 | Allen | H04L 67/34 709/220 |
| 11,816,504 B2 * | 11/2023 | Bogineni | H04W 4/70 |
| 11,843,517 B1 * | 12/2023 | Prateek | H04L 41/18 |
| 11,966,308 B2 * | 4/2024 | Hicks | G06F 11/3668 |
| 12,056,515 B1 * | 8/2024 | Mills | G06F 21/53 |
| 12,063,166 B1 * | 8/2024 | Samba | H04L 47/781 |
| 12,081,629 B1 * | 9/2024 | Wei | G06F 8/60 |
| 12,177,110 B1 * | 12/2024 | Choudhry | H04L 45/28 |
| 2001/0044817 A1 | 11/2001 | Asano et al. | |
| 2002/0083012 A1 | 6/2002 | Bush et al. | |
| 2002/0120685 A1 | 8/2002 | Srivastava et al. | |
| 2002/0172273 A1 | 11/2002 | Baker et al. | |
| 2003/0071842 A1 | 4/2003 | King et al. | |
| 2003/0084434 A1 | 5/2003 | Ren | |
| 2003/0149801 A1 | 8/2003 | Kushnirskiy | |
| 2003/0177186 A1 | 9/2003 | Goodman et al. | |
| 2003/0191795 A1 | 10/2003 | Bernardin et al. | |
| 2003/0208569 A1 | 11/2003 | O'Brien et al. | |
| 2003/0229794 A1 | 12/2003 | James, II et al. | |
| 2004/0003087 A1 | 1/2004 | Chambliss et al. | |
| 2004/0019886 A1 | 1/2004 | Berent et al. | |
| 2004/0044721 A1 | 3/2004 | Song et al. | |
| 2004/0049768 A1 | 3/2004 | Matsuyama et al. | |
| 2004/0098154 A1 | 5/2004 | McCarthy | |
| 2004/0158551 A1 | 8/2004 | Santosuosso | |
| 2004/0205493 A1 | 10/2004 | Simpson et al. | |
| 2004/0249947 A1 | 12/2004 | Novaes et al. | |
| 2004/0268358 A1 | 12/2004 | Darling et al. | |
| 2005/0027611 A1 | 2/2005 | Wharton | |
| 2005/0044301 A1 | 2/2005 | Vasilevsky et al. | |
| 2005/0120160 A1 | 6/2005 | Plouffe et al. | |
| 2005/0132167 A1 | 6/2005 | Longobardi | |
| 2005/0132368 A1 | 6/2005 | Sexton et al. | |
| 2005/0149535 A1 | 7/2005 | Frey et al. | |
| 2005/0193113 A1 | 9/2005 | Kokusho et al. | |
| 2005/0193283 A1 | 9/2005 | Reinhardt et al. | |
| 2005/0237948 A1 | 10/2005 | Wan et al. | |
| 2005/0257051 A1 | 11/2005 | Richard | |
| 2005/0262183 A1 | 11/2005 | Colrain et al. | |
| 2005/0262512 A1 | 11/2005 | Schmidt et al. | |
| 2006/0010440 A1 | 1/2006 | Anderson et al. | |
| 2006/0015740 A1 | 1/2006 | Kramer | |
| 2006/0031448 A1 | 2/2006 | Chu et al. | |
| 2006/0036941 A1 | 2/2006 | Neil | |
| 2006/0080678 A1 | 4/2006 | Bailey et al. | |
| 2006/0123066 A1 | 6/2006 | Jacobs et al. | |
| 2006/0129684 A1 | 6/2006 | Datta | |
| 2006/0155800 A1 | 7/2006 | Matsumoto | |
| 2006/0168174 A1 | 7/2006 | Gebhart et al. | |
| 2006/0184669 A1 | 8/2006 | Vaidyanathan et al. | |
| 2006/0200668 A1 | 9/2006 | Hybre et al. | |
| 2006/0212332 A1 | 9/2006 | Jackson | |
| 2006/0218601 A1 | 9/2006 | Michel | |
| 2006/0242647 A1 | 10/2006 | Kimbrel et al. | |
| 2006/0242709 A1 | 10/2006 | Seinfeld et al. | |
| 2006/0248195 A1 | 11/2006 | Toumura et al. | |
| 2006/0259763 A1 | 11/2006 | Cooperstein et al. | |
| 2006/0282330 A1 | 12/2006 | Frank et al. | |
| 2006/0288120 A1 | 12/2006 | Hoshino et al. | |
| 2007/0033085 A1 | 2/2007 | Johnson | |
| 2007/0050779 A1 | 3/2007 | Hayashi | |
| 2007/0067321 A1 | 3/2007 | Bissett et al. | |
| 2007/0076244 A1 | 4/2007 | Suzuki et al. | |
| 2007/0094396 A1 | 4/2007 | Takano et al. | |
| 2007/0101325 A1 | 5/2007 | Bystricky et al. | |
| 2007/0112864 A1 | 5/2007 | Ben-Natan | |
| 2007/0130341 A1 | 6/2007 | Ma | |
| 2007/0174419 A1 | 7/2007 | O'Connell et al. | |
| 2007/0180449 A1 | 8/2007 | Croft et al. | |
| 2007/0180450 A1 | 8/2007 | Croft et al. | |
| 2007/0180493 A1 | 8/2007 | Croft et al. | |
| 2007/0186212 A1 | 8/2007 | Mazzaferri et al. | |
| 2007/0192082 A1 | 8/2007 | Gaos et al. | |
| 2007/0192329 A1 | 8/2007 | Croft et al. | |
| 2007/0198656 A1 | 8/2007 | Mazzaferri et al. | |
| 2007/0199000 A1 | 8/2007 | Shekhel et al. | |
| 2007/0220009 A1 | 9/2007 | Morris et al. | |
| 2007/0226700 A1 | 9/2007 | Gal et al. | |
| 2007/0240160 A1 | 10/2007 | Paterson-Jones | |
| 2007/0255604 A1 | 11/2007 | Seelig | |
| 2007/0300297 A1 | 12/2007 | Dawson et al. | |
| 2008/0028409 A1 | 1/2008 | Cherkasova et al. | |
| 2008/0052401 A1 | 2/2008 | Bugenhagen et al. | |
| 2008/0052725 A1 | 2/2008 | Stoodley et al. | |
| 2008/0082977 A1 | 4/2008 | Araujo et al. | |
| 2008/0104247 A1 | 5/2008 | Venkatakrishnan et al. | |
| 2008/0104608 A1 | 5/2008 | Hyser et al. | |
| 2008/0115143 A1 | 5/2008 | Shimizu et al. | |
| 2008/0126110 A1 | 5/2008 | Haeberle et al. | |
| 2008/0126486 A1 | 5/2008 | Heist | |
| 2008/0127125 A1 | 5/2008 | Anckaert et al. | |
| 2008/0147893 A1 | 6/2008 | Marripudi et al. | |
| 2008/0178278 A1 | 7/2008 | Grinstein et al. | |
| 2008/0184340 A1 | 7/2008 | Nakamura et al. | |
| 2008/0189468 A1 | 8/2008 | Schmidt et al. | |
| 2008/0195369 A1 | 8/2008 | Duyanovich et al. | |
| 2008/0201568 A1 | 8/2008 | Quinn et al. | |
| 2008/0201711 A1 | 8/2008 | Amir Husain | |
| 2008/0209423 A1 | 8/2008 | Hirai | |
| 2008/0244547 A1 | 10/2008 | Wintergerst et al. | |
| 2008/0288940 A1 | 11/2008 | Adams et al. | |
| 2008/0307098 A1 | 12/2008 | Kelly | |
| 2009/0006897 A1 | 1/2009 | Sarsfield | |
| 2009/0013153 A1 | 1/2009 | Hilton | |
| 2009/0018892 A1 | 1/2009 | Grey et al. | |
| 2009/0025009 A1 | 1/2009 | Brunswig et al. | |
| 2009/0034537 A1 | 2/2009 | Colrain et al. | |
| 2009/0055810 A1 | 2/2009 | Kondur | |
| 2009/0055829 A1 | 2/2009 | Gibson | |
| 2009/0070355 A1 | 3/2009 | Cadarette et al. | |
| 2009/0077569 A1 | 3/2009 | Appleton et al. | |
| 2009/0125902 A1 | 5/2009 | Ghosh et al. | |
| 2009/0158275 A1 | 6/2009 | Wang et al. | |
| 2009/0158407 A1 | 6/2009 | Nicodemus et al. | |
| 2009/0177860 A1 | 7/2009 | Zhu et al. | |
| 2009/0183162 A1 | 7/2009 | Kindel et al. | |
| 2009/0193410 A1 | 7/2009 | Arthursson et al. | |
| 2009/0198769 A1 | 8/2009 | Keller et al. | |
| 2009/0204960 A1 | 8/2009 | Ben-Yehuda et al. | |
| 2009/0204964 A1 | 8/2009 | Foley et al. | |
| 2009/0222922 A1 | 9/2009 | Sidiroglou et al. | |
| 2009/0271472 A1 | 10/2009 | Scheifler et al. | |
| 2009/0288084 A1 | 11/2009 | Astete et al. | |
| 2009/0300151 A1 | 12/2009 | Friedman et al. | |
| 2009/0300599 A1 | 12/2009 | Piotrowski | |
| 2009/0307430 A1 | 12/2009 | Bruening et al. | |
| 2010/0023940 A1 | 1/2010 | Iwamatsu et al. | |
| 2010/0031274 A1 | 2/2010 | Sim-Tang | |
| 2010/0031325 A1 | 2/2010 | Maigne et al. | |
| 2010/0036925 A1 | 2/2010 | Haffner | |
| 2010/0037031 A1 | 2/2010 | DeSantis et al. | |
| 2010/0058342 A1 | 3/2010 | Machida | |
| 2010/0058351 A1 | 3/2010 | Yahagi | |
| 2010/0064299 A1 | 3/2010 | Kacin et al. | |
| 2010/0070678 A1 | 3/2010 | Zhang et al. | |
| 2010/0070725 A1 | 3/2010 | Prahlad et al. | |
| 2010/0083048 A1 | 4/2010 | Calinoiu et al. | |
| 2010/0083248 A1 | 4/2010 | Wood et al. | |
| 2010/0094816 A1 | 4/2010 | Groves, Jr. et al. | |
| 2010/0106926 A1 | 4/2010 | Kandasamy et al. | |
| 2010/0114825 A1 | 5/2010 | Siddegowda | |
| 2010/0115098 A1 | 5/2010 | De Baer et al. | |
| 2010/0122343 A1 | 5/2010 | Ghosh | |

(56) References Cited

U.S. PATENT DOCUMENTS

| | | |
|---|---|---|
| 2010/0131936 A1 | 5/2010 | Cheriton |
| 2010/0131959 A1 | 5/2010 | Spiers et al. |
| 2010/0146004 A1 | 6/2010 | Sim-Tang |
| 2010/0169477 A1 | 7/2010 | Stienhans et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0257269 A1 | 10/2010 | Clark |
| 2010/0269109 A1 | 10/2010 | Cartales |
| 2010/0298011 A1 | 11/2010 | Pelley et al. |
| 2010/0299541 A1 | 11/2010 | Ishikawa et al. |
| 2010/0312871 A1 | 12/2010 | Desantis et al. |
| 2010/0325727 A1 | 12/2010 | Neystadt et al. |
| 2010/0329149 A1 | 12/2010 | Singh et al. |
| 2010/0329643 A1 | 12/2010 | Kuang |
| 2011/0004687 A1 | 1/2011 | Takemura |
| 2011/0010690 A1 | 1/2011 | Howard et al. |
| 2011/0010722 A1 | 1/2011 | Matsuyama |
| 2011/0023026 A1 | 1/2011 | Oza |
| 2011/0029970 A1 | 2/2011 | Arasaratnam |
| 2011/0029984 A1 | 2/2011 | Norman et al. |
| 2011/0035785 A1 | 2/2011 | Mihara |
| 2011/0040812 A1 | 2/2011 | Phillips |
| 2011/0055378 A1 | 3/2011 | Ferris et al. |
| 2011/0055396 A1 | 3/2011 | DeHaan |
| 2011/0055683 A1 | 3/2011 | Jiang |
| 2011/0078679 A1 | 3/2011 | Bozek et al. |
| 2011/0099204 A1 | 4/2011 | Thaler |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153541 A1 | 6/2011 | Koch et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0173637 A1 | 7/2011 | Brandwine et al. |
| 2011/0179162 A1 | 7/2011 | Mayo et al. |
| 2011/0184993 A1 | 7/2011 | Chawla et al. |
| 2011/0208866 A1 | 8/2011 | Marmolejo-Meillon et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0258603 A1 | 10/2011 | Wisnovsky et al. |
| 2011/0265067 A1 | 10/2011 | Schulte et al. |
| 2011/0265069 A1 | 10/2011 | Fee et al. |
| 2011/0265164 A1 | 10/2011 | Lucovsky |
| 2011/0271276 A1 | 11/2011 | Ashok et al. |
| 2011/0276945 A1 | 11/2011 | Chasman et al. |
| 2011/0276963 A1 | 11/2011 | Wu et al. |
| 2011/0296412 A1 | 12/2011 | Banga et al. |
| 2011/0314465 A1 | 12/2011 | Smith et al. |
| 2011/0321033 A1 | 12/2011 | Kelkar et al. |
| 2011/0321051 A1 | 12/2011 | Rastogi |
| 2012/0011496 A1 | 1/2012 | Shimamura |
| 2012/0011511 A1 | 1/2012 | Horvitz et al. |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0060207 A1 | 3/2012 | Mardikar et al. |
| 2012/0072762 A1 | 3/2012 | Atchison et al. |
| 2012/0072914 A1 | 3/2012 | Ota |
| 2012/0072920 A1 | 3/2012 | Kawamura |
| 2012/0079004 A1 | 3/2012 | Herman |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0102481 A1 | 4/2012 | Mani et al. |
| 2012/0102493 A1 | 4/2012 | Allen et al. |
| 2012/0110155 A1 | 5/2012 | Adlung et al. |
| 2012/0110164 A1 | 5/2012 | Frey et al. |
| 2012/0110570 A1 | 5/2012 | Jacobson et al. |
| 2012/0110588 A1 | 5/2012 | Bieswanger et al. |
| 2012/0110603 A1 | 5/2012 | Kaneko et al. |
| 2012/0124563 A1 | 5/2012 | Chung et al. |
| 2012/0131379 A1 | 5/2012 | Tameshige et al. |
| 2012/0144290 A1 | 6/2012 | Goldman et al. |
| 2012/0166624 A1 | 6/2012 | Suit et al. |
| 2012/0173709 A1 | 7/2012 | Li et al. |
| 2012/0192184 A1 | 7/2012 | Burckart et al. |
| 2012/0197795 A1 | 8/2012 | Campbell et al. |
| 2012/0197958 A1 | 8/2012 | Nightingale et al. |
| 2012/0198442 A1 | 8/2012 | Kashyap et al. |
| 2012/0198514 A1 | 8/2012 | McCune et al. |
| 2012/0204164 A1 | 8/2012 | Castanos et al. |
| 2012/0209947 A1 | 8/2012 | Glaser et al. |
| 2012/0222038 A1 | 8/2012 | Katragadda et al. |
| 2012/0233464 A1 | 9/2012 | Miller et al. |
| 2012/0254193 A1 | 10/2012 | Chattopadhyay et al. |
| 2012/0324052 A1 | 12/2012 | Paleja et al. |
| 2012/0324236 A1 | 12/2012 | Srivastava et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0061212 A1 | 3/2013 | Krause et al. |
| 2013/0061220 A1 | 3/2013 | Gnanasambandam et al. |
| 2013/0067484 A1 | 3/2013 | Sonoda et al. |
| 2013/0067494 A1 | 3/2013 | Srour et al. |
| 2013/0080641 A1 | 3/2013 | Lui et al. |
| 2013/0091387 A1 | 4/2013 | Bohnet et al. |
| 2013/0097601 A1 | 4/2013 | Podvratnik et al. |
| 2013/0111032 A1 | 5/2013 | Alapati et al. |
| 2013/0111469 A1 | 5/2013 | B et al. |
| 2013/0124807 A1 | 5/2013 | Nielsen et al. |
| 2013/0132283 A1 | 5/2013 | Hayhow et al. |
| 2013/0132942 A1 | 5/2013 | Wang |
| 2013/0132953 A1 | 5/2013 | Chuang et al. |
| 2013/0139152 A1 | 5/2013 | Chang et al. |
| 2013/0139166 A1 | 5/2013 | Zhang et al. |
| 2013/0145354 A1 | 6/2013 | Bruening et al. |
| 2013/0151587 A1 | 6/2013 | Takeshima et al. |
| 2013/0151648 A1 | 6/2013 | Luna |
| 2013/0151684 A1 | 6/2013 | Forsman et al. |
| 2013/0152047 A1 | 6/2013 | Moorthi et al. |
| 2013/0167147 A1 | 6/2013 | Corrie et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0181998 A1 | 7/2013 | Malakapalli et al. |
| 2013/0185719 A1 | 7/2013 | Kar et al. |
| 2013/0185729 A1 | 7/2013 | Vasic et al. |
| 2013/0191847 A1 | 7/2013 | Sirota et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0198748 A1 | 8/2013 | Sharp et al. |
| 2013/0198763 A1 | 8/2013 | Kunze et al. |
| 2013/0205092 A1 | 8/2013 | Roy et al. |
| 2013/0205114 A1 | 8/2013 | Badam et al. |
| 2013/0219390 A1 | 8/2013 | Lee et al. |
| 2013/0227097 A1 | 8/2013 | Yasuda et al. |
| 2013/0227534 A1 | 8/2013 | Ike et al. |
| 2013/0227563 A1 | 8/2013 | McGrath |
| 2013/0227641 A1 | 8/2013 | White et al. |
| 2013/0227710 A1 | 8/2013 | Barak et al. |
| 2013/0232190 A1 | 9/2013 | Miller et al. |
| 2013/0232480 A1 | 9/2013 | Winterfeldt et al. |
| 2013/0239125 A1 | 9/2013 | Iorio |
| 2013/0246944 A1 | 9/2013 | Pandiyan et al. |
| 2013/0262556 A1 | 10/2013 | Xu et al. |
| 2013/0263117 A1 | 10/2013 | Konik et al. |
| 2013/0274006 A1 | 10/2013 | Hudlow et al. |
| 2013/0275376 A1 | 10/2013 | Hudlow et al. |
| 2013/0275958 A1 | 10/2013 | Ivanov et al. |
| 2013/0275969 A1 | 10/2013 | Dimitrov |
| 2013/0275975 A1 | 10/2013 | Masuda et al. |
| 2013/0283141 A1 | 10/2013 | Stevenson et al. |

(56) References Cited

U.S. PATENT DOCUMENTS

| | | |
|---|---|---|
| 2013/0283176 A1 | 10/2013 | Hoole et al. |
| 2013/0290538 A1 | 10/2013 | Gmach et al. |
| 2013/0291087 A1 | 10/2013 | Kailash et al. |
| 2013/0297964 A1 | 11/2013 | Hegdal et al. |
| 2013/0298183 A1 | 11/2013 | McGrath et al. |
| 2013/0311650 A1 | 11/2013 | Brandwine et al. |
| 2013/0326506 A1 | 12/2013 | McGrath et al. |
| 2013/0326507 A1 | 12/2013 | McGrath et al. |
| 2013/0332660 A1 | 12/2013 | Talagala et al. |
| 2013/0339950 A1 | 12/2013 | Ramarathinam et al. |
| 2013/0346470 A1 | 12/2013 | Obstfeld et al. |
| 2013/0346946 A1 | 12/2013 | Pinnix |
| 2013/0346952 A1 | 12/2013 | Huang et al. |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019523 A1 | 1/2014 | Heymann et al. |
| 2014/0019735 A1 | 1/2014 | Menon et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0047437 A1 | 2/2014 | Wu et al. |
| 2014/0058871 A1 | 2/2014 | Marr et al. |
| 2014/0059209 A1 | 2/2014 | Alnoor |
| 2014/0059226 A1 | 2/2014 | Messerli et al. |
| 2014/0059552 A1 | 2/2014 | Cunningham et al. |
| 2014/0068568 A1 | 3/2014 | Wisnovsky |
| 2014/0068608 A1 | 3/2014 | Kulkarni |
| 2014/0068611 A1 | 3/2014 | McGrath et al. |
| 2014/0073300 A1 | 3/2014 | Leeder et al. |
| 2014/0081984 A1 | 3/2014 | Sitsky et al. |
| 2014/0082165 A1 | 3/2014 | Marr et al. |
| 2014/0082201 A1 | 3/2014 | Shankari et al. |
| 2014/0101643 A1 | 4/2014 | Inoue |
| 2014/0101649 A1 | 4/2014 | Kamble et al. |
| 2014/0108722 A1 | 4/2014 | Lipchuk et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0137110 A1 | 5/2014 | Engle et al. |
| 2014/0164551 A1 | 6/2014 | Resch et al. |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0189704 A1 | 7/2014 | Narvaez et al. |
| 2014/0201735 A1 | 7/2014 | Kannan et al. |
| 2014/0207912 A1 | 7/2014 | Thibeault |
| 2014/0214752 A1 | 7/2014 | Rash et al. |
| 2014/0215073 A1 | 7/2014 | Dow et al. |
| 2014/0229221 A1 | 8/2014 | Shih et al. |
| 2014/0229942 A1 | 8/2014 | Wiseman et al. |
| 2014/0245297 A1 | 8/2014 | Hackett |
| 2014/0258777 A1 | 9/2014 | Cheriton |
| 2014/0279581 A1 | 9/2014 | Devereaux |
| 2014/0280325 A1 | 9/2014 | Krishnamurthy et al. |
| 2014/0282418 A1 | 9/2014 | Wood et al. |
| 2014/0282559 A1 | 9/2014 | Verduzco et al. |
| 2014/0282615 A1 | 9/2014 | Cavage et al. |
| 2014/0282629 A1 | 9/2014 | Gupta et al. |
| 2014/0283045 A1 | 9/2014 | Brandwine et al. |
| 2014/0289286 A1 | 9/2014 | Gusak |
| 2014/0298295 A1 | 10/2014 | Overbeck |
| 2014/0304246 A1 | 10/2014 | Helmich et al. |
| 2014/0304698 A1 | 10/2014 | Chigurapati et al. |
| 2014/0304815 A1 | 10/2014 | Maeda |
| 2014/0317617 A1 | 10/2014 | O'Donnell |
| 2014/0330936 A1 | 11/2014 | Factor et al. |
| 2014/0331222 A1 | 11/2014 | Zheng |
| 2014/0337953 A1 | 11/2014 | Banatwala et al. |
| 2014/0344457 A1 | 11/2014 | Bruno, Jr. et al. |
| 2014/0344736 A1 | 11/2014 | Ryman et al. |
| 2014/0351674 A1 | 11/2014 | Grube et al. |
| 2014/0359093 A1 | 12/2014 | Raju et al. |
| 2014/0359608 A1 | 12/2014 | Tsirkin et al. |
| 2014/0365781 A1 | 12/2014 | Dmitrienko et al. |
| 2014/0372489 A1 | 12/2014 | Jaiswal et al. |
| 2014/0372533 A1 | 12/2014 | Fu et al. |
| 2014/0380085 A1 | 12/2014 | Rash et al. |
| 2015/0006487 A1 | 1/2015 | Yang et al. |
| 2015/0025989 A1 | 1/2015 | Dunstan |
| 2015/0033241 A1 | 1/2015 | Jackson et al. |
| 2015/0039891 A1 | 2/2015 | Ignatchenko et al. |
| 2015/0040229 A1 | 2/2015 | Chan et al. |
| 2015/0046926 A1 | 2/2015 | Kenchammana-Hosekote et al. |
| 2015/0046971 A1 | 2/2015 | Huh et al. |
| 2015/0052258 A1 | 2/2015 | Johnson et al. |
| 2015/0058914 A1 | 2/2015 | Yadav |
| 2015/0067019 A1 | 3/2015 | Balko |
| 2015/0067830 A1 | 3/2015 | Johansson et al. |
| 2015/0074659 A1 | 3/2015 | Madsen et al. |
| 2015/0074661 A1 | 3/2015 | Kothari et al. |
| 2015/0074662 A1 | 3/2015 | Saladi et al. |
| 2015/0074675 A1 | 3/2015 | Qi et al. |
| 2015/0081885 A1 | 3/2015 | Thomas et al. |
| 2015/0095822 A1 | 4/2015 | Feis et al. |
| 2015/0106805 A1 | 4/2015 | Melander et al. |
| 2015/0120928 A1 | 4/2015 | Gummaraju et al. |
| 2015/0121391 A1 | 4/2015 | Wang |
| 2015/0134626 A1 | 5/2015 | Theimer et al. |
| 2015/0135287 A1 | 5/2015 | Medeiros et al. |
| 2015/0142747 A1 | 5/2015 | Zou |
| 2015/0142952 A1 | 5/2015 | Bragstad et al. |
| 2015/0143374 A1 | 5/2015 | Banga et al. |
| 2015/0143381 A1 | 5/2015 | Chin et al. |
| 2015/0146716 A1 | 5/2015 | Olivier et al. |
| 2015/0154046 A1 | 6/2015 | Farkas et al. |
| 2015/0161384 A1 | 6/2015 | Gu et al. |
| 2015/0163231 A1 | 6/2015 | Sobko et al. |
| 2015/0178019 A1 | 6/2015 | Hegdal et al. |
| 2015/0178110 A1 | 6/2015 | Li et al. |
| 2015/0186129 A1 | 7/2015 | Apte et al. |
| 2015/0188775 A1 | 7/2015 | Van Der Walt et al. |
| 2015/0199218 A1 | 7/2015 | Wilson et al. |
| 2015/0205596 A1 | 7/2015 | Hiltegen et al. |
| 2015/0206139 A1 | 7/2015 | Lea |
| 2015/0212818 A1 | 7/2015 | Gschwind et al. |
| 2015/0227598 A1 | 8/2015 | Hahn et al. |
| 2015/0229645 A1 | 8/2015 | Keith et al. |
| 2015/0235144 A1 | 8/2015 | Gusev et al. |
| 2015/0242225 A1 | 8/2015 | Muller et al. |
| 2015/0254248 A1 | 9/2015 | Burns et al. |
| 2015/0256514 A1 | 9/2015 | Laivand et al. |
| 2015/0256621 A1 | 9/2015 | Noda et al. |
| 2015/0261578 A1 | 9/2015 | Greden et al. |
| 2015/0264014 A1 | 9/2015 | Budhani et al. |
| 2015/0269494 A1 | 9/2015 | Kardes et al. |
| 2015/0271073 A1 | 9/2015 | Saladi et al. |
| 2015/0271280 A1 | 9/2015 | Zhang et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0319174 A1 | 11/2015 | Hayton et al. |
| 2015/0324174 A1 | 11/2015 | Bromley et al. |
| 2015/0324182 A1 | 11/2015 | Barros et al. |
| 2015/0324210 A1 | 11/2015 | Carlson |
| 2015/0324229 A1 | 11/2015 | Valine |
| 2015/0332048 A1 | 11/2015 | Mooring et al. |
| 2015/0332195 A1 | 11/2015 | Jue |
| 2015/0334173 A1 | 11/2015 | Coulmeau et al. |
| 2015/0350701 A1 | 12/2015 | Lemus et al. |
| 2015/0356294 A1 | 12/2015 | Tan et al. |
| 2015/0363181 A1 | 12/2015 | Alberti et al. |
| 2015/0363304 A1 | 12/2015 | Nagamalla et al. |
| 2015/0370560 A1 | 12/2015 | Tan et al. |
| 2015/0370591 A1 | 12/2015 | Tuch et al. |
| 2015/0370592 A1 | 12/2015 | Tuch et al. |
| 2015/0371244 A1 | 12/2015 | Neuse et al. |
| 2015/0378762 A1 | 12/2015 | Saladi et al. |

(56) References Cited

U.S. PATENT DOCUMENTS

| | | |
|---|---|---|
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0011901 A1 | 1/2016 | Hurwitz et al. |
| 2016/0012099 A1 | 1/2016 | Tuatini et al. |
| 2016/0019081 A1 | 1/2016 | Chandrasekaran et al. |
| 2016/0019082 A1 | 1/2016 | Chandrasekaran et al. |
| 2016/0019536 A1 | 1/2016 | Ortiz et al. |
| 2016/0021112 A1 | 1/2016 | Katieb |
| 2016/0026486 A1 | 1/2016 | Abdallah |
| 2016/0048606 A1 | 2/2016 | Rubinstein et al. |
| 2016/0070714 A1 | 3/2016 | D'Sa et al. |
| 2016/0072727 A1 | 3/2016 | Leafe et al. |
| 2016/0072781 A1 | 3/2016 | Zhang et al. |
| 2016/0077901 A1 | 3/2016 | Roth et al. |
| 2016/0092320 A1 | 3/2016 | Baca |
| 2016/0092493 A1 | 3/2016 | Ko et al. |
| 2016/0098285 A1 | 4/2016 | Davis et al. |
| 2016/0100036 A1 | 4/2016 | Lo et al. |
| 2016/0103739 A1 | 4/2016 | Huang et al. |
| 2016/0110188 A1 | 4/2016 | Verde et al. |
| 2016/0117163 A1 | 4/2016 | Fukui et al. |
| 2016/0117254 A1 | 4/2016 | Susarla et al. |
| 2016/0119289 A1 | 4/2016 | Jain et al. |
| 2016/0124665 A1 | 5/2016 | Jain et al. |
| 2016/0124978 A1 | 5/2016 | Nithrakashyap et al. |
| 2016/0140180 A1 | 5/2016 | Park et al. |
| 2016/0150053 A1 | 5/2016 | Janczuk et al. |
| 2016/0188367 A1 | 6/2016 | Zeng |
| 2016/0191420 A1 | 6/2016 | Nagarajan et al. |
| 2016/0198235 A1 | 7/2016 | Liu et al. |
| 2016/0203219 A1 | 7/2016 | Hoch et al. |
| 2016/0212007 A1 | 7/2016 | Alatorre et al. |
| 2016/0226955 A1 | 8/2016 | Moorthi et al. |
| 2016/0282930 A1 | 9/2016 | Ramachandran et al. |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0306613 A1 | 10/2016 | Busi et al. |
| 2016/0315910 A1 | 10/2016 | Kaufman |
| 2016/0350099 A1 | 12/2016 | Suparna et al. |
| 2016/0350124 A1 | 12/2016 | Gschwind et al. |
| 2016/0357536 A1 | 12/2016 | Firlik et al. |
| 2016/0364265 A1 | 12/2016 | Cao et al. |
| 2016/0364316 A1 | 12/2016 | Bhat et al. |
| 2016/0371127 A1 | 12/2016 | Antony et al. |
| 2016/0371156 A1 | 12/2016 | Merriman |
| 2016/0378449 A1 | 12/2016 | Khazanchi et al. |
| 2016/0378525 A1 | 12/2016 | Bjorkengren |
| 2016/0378547 A1 | 12/2016 | Brouwer et al. |
| 2016/0378554 A1 | 12/2016 | Gummaraju et al. |
| 2017/0004169 A1 | 1/2017 | Merrill et al. |
| 2017/0032000 A1 | 2/2017 | Sharma et al. |
| 2017/0041144 A1 | 2/2017 | Krapf et al. |
| 2017/0041309 A1 | 2/2017 | Ekambaram et al. |
| 2017/0060615 A1 | 3/2017 | Thakkar et al. |
| 2017/0060621 A1 | 3/2017 | Whipple et al. |
| 2017/0068574 A1 | 3/2017 | Cherkasova et al. |
| 2017/0075749 A1 | 3/2017 | Ambichl et al. |
| 2017/0083381 A1 | 3/2017 | Cong et al. |
| 2017/0085447 A1 | 3/2017 | Chen et al. |
| 2017/0085502 A1 | 3/2017 | Biruduraju |
| 2017/0085591 A1 | 3/2017 | Ganda et al. |
| 2017/0091235 A1 | 3/2017 | Yammine et al. |
| 2017/0091296 A1 | 3/2017 | Beard et al. |
| 2017/0093684 A1 | 3/2017 | Jayaraman et al. |
| 2017/0093920 A1 | 3/2017 | Ducatel et al. |
| 2017/0134519 A1 | 5/2017 | Chen et al. |
| 2017/0142099 A1 | 5/2017 | Hinohara et al. |
| 2017/0147656 A1 | 5/2017 | Choudhary et al. |
| 2017/0149740 A1 | 5/2017 | Mansour et al. |
| 2017/0153965 A1 | 6/2017 | Nitta et al. |
| 2017/0161059 A1 | 6/2017 | Wood et al. |
| 2017/0177266 A1 | 6/2017 | Doerner et al. |
| 2017/0177441 A1 | 6/2017 | Chow |
| 2017/0177854 A1 | 6/2017 | Gligor et al. |
| 2017/0188213 A1 | 6/2017 | Nirantar et al. |
| 2017/0192825 A1 | 7/2017 | Biberman et al. |
| 2017/0221000 A1 | 8/2017 | Anand |
| 2017/0230262 A1 | 8/2017 | Sreeramoju et al. |
| 2017/0230499 A1 | 8/2017 | Mumick et al. |
| 2017/0249130 A1 | 8/2017 | Smiljamic et al. |
| 2017/0264681 A1 | 9/2017 | Apte et al. |
| 2017/0272462 A1 | 9/2017 | Kraemer et al. |
| 2017/0286187 A1 | 10/2017 | Chen et al. |
| 2017/0288878 A1 | 10/2017 | Lee et al. |
| 2017/0308520 A1 | 10/2017 | Beahan, Jr. et al. |
| 2017/0315163 A1 | 11/2017 | Wang et al. |
| 2017/0322824 A1 | 11/2017 | Reuther et al. |
| 2017/0329578 A1 | 11/2017 | Iscen |
| 2017/0346808 A1 | 11/2017 | Anzai et al. |
| 2017/0353851 A1 | 12/2017 | Gonzalez et al. |
| 2017/0364345 A1 | 12/2017 | Fontoura et al. |
| 2017/0371720 A1 | 12/2017 | Basu et al. |
| 2017/0372142 A1 | 12/2017 | Bilobrov |
| 2018/0004555 A1 | 1/2018 | Ramanathan et al. |
| 2018/0004556 A1 | 1/2018 | Marriner et al. |
| 2018/0032410 A1 | 2/2018 | Kang et al. |
| 2018/0046453 A1 | 2/2018 | Nair et al. |
| 2018/0046482 A1 | 2/2018 | Karve et al. |
| 2018/0060132 A1 | 3/2018 | Maru et al. |
| 2018/0060221 A1 | 3/2018 | Yim et al. |
| 2018/0060318 A1 | 3/2018 | Yang et al. |
| 2018/0067841 A1 | 3/2018 | Mahimkar |
| 2018/0067873 A1 | 3/2018 | Pikhur et al. |
| 2018/0069702 A1 | 3/2018 | Ayyadevara et al. |
| 2018/0081717 A1 | 3/2018 | Li |
| 2018/0089232 A1 | 3/2018 | Spektor et al. |
| 2018/0095738 A1 | 4/2018 | Dürkop et al. |
| 2018/0113770 A1 | 4/2018 | Hasanov et al. |
| 2018/0113793 A1 | 4/2018 | Fink et al. |
| 2018/0121665 A1 | 5/2018 | Anderson et al. |
| 2018/0129684 A1 | 5/2018 | Wilson et al. |
| 2018/0144263 A1 | 5/2018 | Saxena et al. |
| 2018/0150339 A1 | 5/2018 | Pan et al. |
| 2018/0152401 A1 | 5/2018 | Tandon et al. |
| 2018/0152405 A1 | 5/2018 | Kuo et al. |
| 2018/0152406 A1 | 5/2018 | Kuo et al. |
| 2018/0165110 A1 | 6/2018 | Htay |
| 2018/0192101 A1 | 7/2018 | Bilobrov |
| 2018/0225096 A1 | 8/2018 | Mishra et al. |
| 2018/0227300 A1 | 8/2018 | Nakic et al. |
| 2018/0239636 A1 | 8/2018 | Arora et al. |
| 2018/0253333 A1 | 9/2018 | Gupta |
| 2018/0268130 A1 | 9/2018 | Ghosh et al. |
| 2018/0275987 A1 | 9/2018 | Vandeputte |
| 2018/0285101 A1 | 10/2018 | Yahav et al. |
| 2018/0300111 A1 | 10/2018 | Bhat et al. |
| 2018/0314845 A1 | 11/2018 | Anderson et al. |
| 2018/0316552 A1 | 11/2018 | Subramani Nadar et al. |
| 2018/0341504 A1 | 11/2018 | Kissell |
| 2018/0365422 A1 | 12/2018 | Callaghan et al. |
| 2018/0367517 A1 | 12/2018 | Tus |
| 2018/0375781 A1 | 12/2018 | Chen et al. |
| 2019/0004866 A1 | 1/2019 | Du et al. |
| 2019/0018715 A1 | 1/2019 | Behrendt et al. |
| 2019/0028552 A1 | 1/2019 | Johnson et al. |
| 2019/0034095 A1 | 1/2019 | Singh et al. |
| 2019/0043231 A1 | 2/2019 | Uzgin et al. |
| 2019/0072529 A1 | 3/2019 | Andrawes et al. |
| 2019/0073430 A1 | 3/2019 | Webster |
| 2019/0079751 A1 | 3/2019 | Foskett et al. |
| 2019/0102278 A1 | 4/2019 | Gahlin et al. |
| 2019/0140831 A1 | 5/2019 | De Lima Junior et al. |
| 2019/0141015 A1 | 5/2019 | Nellen |
| 2019/0147085 A1 | 5/2019 | Pal et al. |
| 2019/0147515 A1 | 5/2019 | Hurley et al. |
| 2019/0171423 A1 | 6/2019 | Mishra et al. |
| 2019/0179678 A1 | 6/2019 | Banerjee et al. |
| 2019/0179725 A1 | 6/2019 | Mital et al. |
| 2019/0180036 A1 | 6/2019 | Shukla |
| 2019/0188288 A1 | 6/2019 | Holm et al. |
| 2019/0235848 A1 | 8/2019 | Swiecki et al. |
| 2019/0238590 A1 | 8/2019 | Talukdar et al. |

(56) References Cited

U.S. PATENT DOCUMENTS

| | | |
|---|---|---|
| 2019/0250937 A1 | 8/2019 | Thomas et al. |
| 2019/0268152 A1 | 8/2019 | Sandoval et al. |
| 2019/0278938 A1 | 9/2019 | Greene et al. |
| 2019/0286475 A1 | 9/2019 | Mani |
| 2019/0286492 A1 | 9/2019 | Gulsvig Wood et al. |
| 2019/0303117 A1 | 10/2019 | Kocberber et al. |
| 2019/0311115 A1 | 10/2019 | Lavi et al. |
| 2019/0318312 A1 | 10/2019 | Foskett et al. |
| 2019/0320038 A1 | 10/2019 | Walsh et al. |
| 2019/0324813 A1 | 10/2019 | Bogineni et al. |
| 2019/0339955 A1* | 11/2019 | Kuo ................ G06F 9/485 |
| 2019/0361802 A1 | 11/2019 | Li et al. |
| 2019/0363885 A1 | 11/2019 | Schiavoni et al. |
| 2019/0370113 A1 | 12/2019 | Zhang et al. |
| 2020/0007456 A1 | 1/2020 | Greenstein et al. |
| 2020/0026527 A1 | 1/2020 | Xu et al. |
| 2020/0028936 A1 | 1/2020 | Gupta et al. |
| 2020/0034471 A1 | 1/2020 | Danilov et al. |
| 2020/0065079 A1 | 2/2020 | Kocberber et al. |
| 2020/0073770 A1 | 3/2020 | Mortimore, Jr. et al. |
| 2020/0073987 A1 | 3/2020 | Perumala et al. |
| 2020/0081745 A1 | 3/2020 | Cybulski et al. |
| 2020/0110691 A1 | 4/2020 | Bryant et al. |
| 2020/0120120 A1 | 4/2020 | Cybulski |
| 2020/0134030 A1 | 4/2020 | Natanzon et al. |
| 2020/0136933 A1 | 4/2020 | Raskar |
| 2020/0153798 A1 | 5/2020 | Liebherr |
| 2020/0153897 A1 | 5/2020 | Mestery et al. |
| 2020/0167208 A1 | 5/2020 | Floes et al. |
| 2020/0192646 A1 | 6/2020 | Yerramreddy et al. |
| 2020/0213151 A1 | 7/2020 | Srivatsan et al. |
| 2020/0241930 A1 | 7/2020 | Garg et al. |
| 2020/0327236 A1 | 10/2020 | Pratt et al. |
| 2020/0348979 A1 | 11/2020 | Calmon |
| 2020/0349067 A1 | 11/2020 | Syamala et al. |
| 2020/0366587 A1 | 11/2020 | White et al. |
| 2020/0401455 A1 | 12/2020 | Church et al. |
| 2021/0019056 A1 | 1/2021 | Mangione-Tran |
| 2021/0081233 A1 | 3/2021 | Mullen et al. |
| 2021/0117534 A1 | 4/2021 | Maximov et al. |
| 2021/0124822 A1 | 4/2021 | Tiwary et al. |
| 2021/0176333 A1 | 6/2021 | Coleman et al. |
| 2021/0294646 A1 | 9/2021 | Hassaan et al. |
| 2022/0012083 A1 | 1/2022 | Brooker et al. |
| 2022/0214863 A1 | 7/2022 | Clement et al. |
| 2022/0391238 A1 | 12/2022 | Wagner |
| 2023/0024699 A1 | 1/2023 | Bayoumi et al. |

FOREIGN PATENT DOCUMENTS

| | | | | |
|---|---|---|---|---|
| CN | 101002170 A | | 7/2007 | |
| CN | 101267334 A | | 9/2008 | |
| CN | 101345757 A | | 1/2009 | |
| CN | 101496005 A | | 7/2009 | |
| CN | 101627388 A | | 1/2010 | |
| CN | 101640700 A | | 2/2010 | |
| CN | 101764824 A | | 6/2010 | |
| CN | 102171712 A | | 8/2011 | |
| CN | 102246152 A | | 11/2011 | |
| CN | 102365858 A | | 2/2012 | |
| CN | 102420846 A | | 4/2012 | |
| CN | 102761549 A | | 10/2012 | |
| CN | 103098027 A | | 5/2013 | |
| CN | 103140828 A | | 6/2013 | |
| CN | 103384237 A | | 11/2013 | |
| CN | 103731427 A | | 4/2014 | |
| CN | 104111848 A | | 10/2014 | |
| CN | 104160378 A | | 11/2014 | |
| CN | 104243479 A | | 12/2014 | |
| CN | 104903854 A | | 9/2015 | |
| CN | 105122243 A | | 12/2015 | |
| CN | 105956000 A | | 9/2016 | |
| CN | 106921651 A | | 7/2017 | |
| CN | 107534672 A | | 1/2018 | |
| CN | 114208112 A | * | 3/2022 | ............. G06F 16/25 |
| EP | 2663052 A1 | | 11/2013 | |
| JP | 2002-287974 A | | 10/2002 | |
| JP | 2006-107599 A | | 4/2006 | |
| JP | 2007-080161 A | | 3/2007 | |
| JP | 2007-538323 A | | 12/2007 | |
| JP | 2010-026562 A | | 2/2010 | |
| JP | 2011-065243 A | | 3/2011 | |
| JP | 2011-233146 A | | 11/2011 | |
| JP | 2011-257847 A | | 12/2011 | |
| JP | 2012-078893 A | | 4/2012 | |
| JP | 2012-104150 A | | 5/2012 | |
| JP | 2013-156996 A | | 8/2013 | |
| JP | 2014-525624 A | | 9/2014 | |
| JP | 2016-507100 A | | 3/2016 | |
| JP | 2017-534107 A | | 11/2017 | |
| JP | 2017-534967 A | | 11/2017 | |
| JP | 2018-503896 A | | 2/2018 | |
| JP | 2018-512087 A | | 5/2018 | |
| JP | 2018-536213 A | | 12/2018 | |
| KR | 10-357850 B1 | | 10/2002 | |
| WO | WO 2008/114454 A1 | | 9/2008 | |
| WO | WO 2009/137567 A1 | | 11/2009 | |
| WO | WO 2012/039834 A1 | | 3/2012 | |
| WO | WO 2012/050772 A1 | | 4/2012 | |
| WO | WO 2013/106257 A1 | | 7/2013 | |
| WO | WO 2015/078394 A1 | | 6/2015 | |
| WO | WO 2015/108539 A1 | | 7/2015 | |
| WO | WO 2015/149017 A1 | | 10/2015 | |
| WO | WO 2016/053950 A1 | | 4/2016 | |
| WO | WO 2016/053968 A1 | | 4/2016 | |
| WO | WO 2016/053973 A1 | | 4/2016 | |
| WO | WO 2016/090292 A1 | | 6/2016 | |
| WO | WO 2016/126731 A1 | | 8/2016 | |
| WO | WO 2016/164633 A1 | | 10/2016 | |
| WO | WO 2016/164638 A1 | | 10/2016 | |
| WO | WO 2017/059248 A1 | | 4/2017 | |
| WO | WO 2017/112526 A1 | | 6/2017 | |
| WO | WO 2017/172440 A1 | | 10/2017 | |
| WO | WO 2018/005829 A1 | | 1/2018 | |
| WO | WO 2018/039514 A1 | | 1/2018 | |
| WO | WO 2018/098443 A1 | | 5/2018 | |
| WO | WO 2018/098445 A1 | | 5/2018 | |
| WO | WO 2020/005764 A1 | | 1/2020 | |
| WO | WO 2020/006081 A1 | | 1/2020 | |
| WO | WO 2020/069104 A1 | | 4/2020 | |
| WO | WO 2020/123439 A1 | | 6/2020 | |
| WO | WO 2020/264431 A1 | | 12/2020 | |
| WO | WO 2021/108435 A1 | | 6/2021 | |
| WO | WO 2023/107649 A1 | | 6/2023 | |

OTHER PUBLICATIONS

Anonymous: "Amazon Cognito Developer Guide," Jun. 24, 2001, XP093030075, retrieved from the internet: URL:https://web.archive.org/web/20210624153941if_/https://docs.aws.amazon.com/cognito/latest/developerguide/cognito-dg.pdf [retrieved on Mar. 9, 2023] the whole document.

Anonymous: "Amazon Simple Workflow Service Developer Guide API Version Jan. 25, 2012," Jun. 11, 2016 (Jun. 11, 2016), XP055946928, Retrieved from the Internet: URL:https://web.archive.org/web/20160111075522if_/http://docs.aws.amazon.com/amazonswf/latest/developerguide/swf-dg.pdf [retrieved on Jul. 28, 2022] in 197 pages.

Anonymous: "alias (command)—Wikipedia," Jun. 28, 2016, pp. 106, XP093089956, Retrieved from the Internet: URL:https://en.wikipedia.org/w/index.php?title=Alias_(command)&oldid=727315645 [retrieved on Oct. 9, 2023.

Anonymous: "AWS Flow Framework for Java," Apr. 7, 2016 (Apr. 7, 2016), XP055946535, Retrieved from the Internet: URL:https://web.archive.org/web/20160407214715if_/http://docs.aws.amazon.com/amazonswf/latest/awsflowguide/swf-aflow.pdf, [retrieved Jul. 27, 2022] in 139 pages.

Anonymous: "AWS Lambda Developer Guide," Jul. 1, 2021, XP093024770, retrieved from the internet: URL:https://web.archieve.org/web/20210701100128if_/https://docs.aws.amazon.com/lambda/latest/dg/lambda-dg.pdf [retrieved on Feb. 17, 2023] the whole document.

(56) References Cited

OTHER PUBLICATIONS

Anonymous: "Docker run reference", Dec. 7, 2015, XP055350246, Retrieved from the Internet:URL:https://web.archive.org/web/20151207111702/https://docs.docker.com/engine/reference/run/ [retrieved on Feb. 28, 2017].

Anonymous: SaaS Tenant Isolution Strategies Isolating Resources in a Multi-Tenant Environment,: Aug. 1, 2020, XP093030095, retrieved from the internet: URL:https://d1.awsstatic.com/whitepapers/saas-tenant-isolation-strategies.pdf [retrieved on Mar. 9, 2023] the whole document.

Anonymous: "Security Overview of AWS Lambda," Aug. 11, 2021, XP093030100, retrieved from the internet:URL:https://web.archive.org/web/20210811044132if_/https://docs.aws.amazon.com/whitepapers/latest/security-overview-aws-lambda/security-overview-aws-lambda.pdf [retrieved Mar. 9, 2023] the whole document.

Abebe et al., "EC-Store: Bridging the Gap Between Storage and Latency in Distribute Erasure CodedSystems", IEEE 38th International Conference on Distributed Computing Systems, 2018, pp. 255-266.

Adapter Pattern, Wikipedia,https://en.wikipedia.org/w/index.php?title=Adapter_pattern&oldid=654971255, [retrieved May 26, 2016], 6 pages.

Amazon, "AWS Lambda: Developer Guide", Jun. 26, 2016 Retrieved from the Internet, URL:http://docs.aws.amazon.com/lambda/latest/dg/lambda-dg.pdf, [retrieved on Aug. 30, 2017], 314 pages.

Amazon, "AWS Lambda: Developer Guide", Apr. 30, 2016 Retrieved from the Internet, URL:https://web.archive.org/web/20160430050158/http://docs.aws.amazon.com:80/lambda/latest/dg/lambda-dg.pdf, 346 pages.

Amazon, "AWS Lambda: Developer Guide", Retrieved from the Internet, 2019, URL : http://docs.aws.amazon.com/lambda/ latest/dg/lambda-dg.pdf, 521 pages.

Balazinska et al., Moirae: History-Enhanced Monitoring, Published: Jan. 2007, 12 pages.

Bebenita et al., "Trace-Based Compilation in Execution Environments without Interpreters," ACM, Copyright 2010, 10 pages.

Ben-Yehuda et al., "Deconstructing Amazon EC2 Spot Instance Pricing", ACM Transactions on Economics and Computation 1.3, Sep. 2013, 15 pages.

Bhadani et al., Performance evaluation of web servers using central load balancing policy over virtual machines on cloud, Jan. 2010, 4 pages.

Bryan Liston, "Ad Hoc Big Data Processing Made Simple with Serverless Map Reduce", Nov. 4, 2016, Amazon Web Services <https ://laws. amazon .com/bl ogs/compute/ad-hoc-big-data-processi ng-made-si mple-with-serverless-mapred uce >.

CodeChef ADMIN discussion web page, retrieved from https://discuss.codechef.com/t/what-are-the-memory-limit-and-stack-size-on-codechef/14159, retrieved on Sep. 10, 2019.

CodeChef IDE web page, Code, Compile & Run, retrieved from https://www.codechef.com/ide, retrieved on Sep. 9, 2019.

Czajkowski, G., and L. Daynes, Multitasking Without Compromise: A Virtual Machine Evolution 47(4a):60-73, ACM SIGPLAN Notices—Supplemental Issue, Apr. 2012.

Das et al., Adaptive Stream Processing using Dynamic Batch Sizing, Nov. 2014, 13 pages.

Deis, Container, Jun. 2014, 1 page.

Dean et al, "MapReduce: Simplified Data Processing on Large Clusters", ACM, 2008, pp. 107-113.

Dombrowski, M., et al., Dynamic Monitor Allocation in the Java Virtual Machine, JTRES '13, Oct. 9-11, 2013, pp. 30-37.

Dornemann et al., "On-Demand Resource Provisioning for BPEL Workflows Using Amazon's ElasticCompute Cloud", 9th IEEE/ACM International Symposium on Cluster Computing and the Grid, 2009, pp. 140-147.

Dynamic HTML, Wikipedia page from date Mar. 27, 2015, retrieved using the WayBackMachine, fromhttps://web.archive.org/web/20150327215418/https://en.wikipedia.org/wiki/Dynamic_HTML, 2015, 6 pages.

Ekanayake et al, "Twister: A Runtime for Iterative MapReduce", ACM, 2010, pp. 810-818.

Espadas, J., et al., A Tenant-Based Resource Allocation Model for Scaling Software-as-a-ServiceApplications Over Cloud Computing Infrastructures, Future Generation Computer Systems, vol. 29, pp. 273-286, 2013.

Fan et al., Online Optimization of VM Deployment in IaaS Cloud, Dec. 17, 2012-Dec. 19, 2012, 6 pages.

Ha et al., A Concurrent Trace-based Just-In-Time Compiler for Single-threaded JavaScript, utexas.edu, Jun. 2009.

Hammoud et al, "Locality-Aware Reduce Task Scheduling for MapReduce", IEEE, 2011, pp. 570-576.

Han et al., Lightweight Resource Scaling for Cloud Applications, May 13, 2012-May 16, 2012, 8 pages.

Hoffman, Auto scaling your website with Amazon Web Services (AWS)—Part 2, Cardinalpath, Sep. 2015, 15 pages.

http://discuss.codechef.com discussion web page from date Nov. 11, 2012, retrieved using the WayBackMachine, from https://web.archive.org/web/20121111040051/http://discuss.codechef.com/questions/2881 /why-are-simple-java-programs-using-up-so-much-space, 2012.

https://www.codechef.com code error help page from Jan. 2014, retrieved from https://www.codechef.com/JAN14/status/ERROR,va123, 2014.

http://www.codechef.com/ide web page from date Apr. 5, 2015, retrieved using the WayBackMachine, from https://web.archive.org/web/20150405045518/http://www.codechef.com/ide, 2015.

Huang, Zhe, Danny HK Tsang, and James She. "A virtual machine consolidation framework formapreduce enabled computing clouds." 2012 24th International Teletraffic Congress (ITC 24). IEEE, Sep. 4, 2012-Sep. 7, 2012.

Huang et al., "Erasure Coding in Windows Azure Storege", USENIX, 2012 in 12 pages.

Kamga et al., Extended scheduler for efficient frequency scaling in virtualized systems, Jul. 2012, 8 pages.

IBM, what is Serverless computing, https://www.ibm.com/topics/serverless#:-:test=Serverless%20is%20a%20cloud%20computing,managing%20servers%20or%20backend%20infrastructure, pp. 1-11 (Year: 2023).

Kato, et al. "Web Service Conversion Architecture of the Web Application and Evaluation"; Research Report from Information Processing Society, Apr. 3, 2006 with Machine Translation.

Kazempour et al., AASH: an asymmetry-aware scheduler for hypervisors, Jul. 2010, 12 pages.

Kim et al, "MRBench: A Benchmark for Map-Reduce Framework", IEEE, 2008, pp. 11-18.

Kraft et al., 10 performance prediction in consolidated virtualized environments, Mar. 2011, 12 pages.

Krsul et al., "VMPlants: Providing and Managing Virtual Machine Execution Environments for GridComputing", Supercomputing, 2004. Proceedings of the ACM/IEEESC 2004 Conference Pittsburgh, PA, XP010780332, Nov. 6-12, 2004, 12 pages.

Lagar-Cavilla et al., "SnowFlock: Virtual Machine Cloning as a First-Class Cloud Primitive", ACMTransactions on Computer Systems, vol. 29, No. 1, Article 2, Publication date: Feb. 2011, in 45 pages.

Lin, "MR-Apriori: Association Rules Algorithm Based on MapReduce", IEEE, 2014, pp. 141-144.

Meng et al., Efficient resource provisioning in compute clouds via VM multiplexing, Jun. 2010, 10 pages.

Merkel, "Docker: Lightweight Linux Containers for Consistent Development and Deployment", Linux Journal, vol. 2014 Issue 239, Mar. 2014, XP055171140, 16 pages.

Parallel and Cloud Monteil, Coupling profile and historical methods to predict execution time of parallel applications. Computing, Jul. 2013, <hal-01228236, pp. 81-89.

Nakajima, J., et al., Optimizing Virtual Machines Using Hybrid Virtualization, SAC '11, Mar. 21-25, 2011, TaiChung, Taiwan, pp. 573-578.

Neenan, Sarah Compare Serverless tools and services in the Public cloud, https://www.techtarget.com/searchcloudcomputing/feature/Compare-serverless-tools-and-services-in-the-public-cloud, TechTarget, pp. 1-4 (Year: 2023).

(56) References Cited

OTHER PUBLICATIONS

Qian, H., and D. Medhi, et al., Estimating Optimal Cost of Allocating Virtualized Resources With Dynamic Demand, ITC 2011, Sep. 2011, pp. 320-321.
Rashmi et al., "EC-Cache: Load-Balance, Low-Latency Cluster Caching with Online Erasure Coding", USENIX, 2016, pp. 401-417.
Ryden et al., "Nebula: Distributed Edge Cloud for Data-Intensive Computing", IEEE, 2014, pp. 491-492.
Sakamoto, et al. "Platform for Web Services using Proxy Server"; Research Report from Information Processing Society, Mar. 22, 2002, vol. 2002, No. 31.
Search Query Report from IP.com, performed Dec. 2, 2020.
Search Query Report from IP.com, performed May 27, 2021.
Sharma A. et al., "Building a Multi-Tenant SaaS Solution Using AWS Serverless Services," Aug. 26, 2021, XP093030094, retrieved from the internet: URL:https://aws.amazon.com/blogs/apn/building-a-multi-tenant-saas-solution-using-aws-serverless-services/ [retrieved on Mar. 9, 2023] the whole document.
Shim (computing), Wikipedia,https://en.wikipedia.org/w/index.php?title+Shim_(computing)&oldid+654971528, [retrieved on May 26, 2016], 2 pages.
Stack Overflow, Creating a database connection pool, Nov. 10, 2009, 4 pages.
Tan et al., Provisioning for large scale cloud computing services, Jun. 2012, 2 pages.
Tange, "GNU Parallel: The Command-Line Power Tool", vol. 36, No. 1, Jan. 1, 1942, pp. 42-47.
Vaghani, S.B., Virtual Machine File System, ACM SIGOPS Operating Systems Review 44(4):57-70, Dec. 2010.
Vaquero, L., et al., Dynamically Scaling Applications in the cloud, ACM SIGCOMM Computer Communication Review 41(1):45-52, Jan. 2011.
Wang et al., "Improving utilization through dynamic VM resource allocation in hybrid cloudenvironment", Parallel and Distributed V Systems (ICPADS), IEEE, Dec. 16, 2014-Dec. 19, 2014. Retrieved on Feb. 14, 2019, Retrieved from the internet: URL<https://ieeexplore.ieee.org/stamp/stamp.jsp?tp=&arnumber=7097814, 8 pages.
Wikipedia "API" pages from date Apr. 7, 2015, retrieved using the WayBackMachine from https://web.archive.org/web/20150407191158/https://en .wikipedia.org/wiki/Application_programming_interface.
Wikipedia List_of_HTTP status_codes web page, retrieved from https://en.wikipedia.org/wiki/List_of_HTTP status_codes, retrieved on Sep. 10, 2019.
Wikipedia Recursion web page from date Mar. 26, 2015, retrieved using the WayBackMachine, from https://web.archive.org/web/20150326230100/https://en .wikipedia.org/wiki/Recursion_ (computer science), 2015.
Wikipedia: Serverless computing, https://en.wikipedia.org/wiki/Serverless_computing, pp. 107 (Year: 2023).
Wikipedia subroutine web page, retrieved from https://en.wikipedia.org/wiki/Subroutine, retrieved on Sep. 10, 2019.
Wood, Timothy, et al. "Cloud Net: dynamic pooling of cloud resources by live WAN migration of virtual machines." ACM Sigplan Notices 46.7 (2011): 121-132. (Year: 2011).
Wu et al., HC-Midware: A Middleware to Enable High Performance Communication System Simulationin Heterogeneous Cloud, Association for Computing Machinery, Oct. 20-22, 2017, 10 pages.
Yamasaki et al. "Model-based resource selection for efficient virtual cluster deployment", Virtualization Technology in Distributed Computing, ACM, Nov. 2007, pp. 1-7.
Yang, The Application of MapReduce in the Cloud Computing:, IEEE, 2011, pp. 154-156.
Yue et al., AC 2012-4107: Using Amazon EC2 in Computer and Network Security Lab Exercises: Design, Results, and Analysis, 2012, American Society for Engineering Education, Jun. 10, 2012.
Zhang et al., VMThunder: Fast Provisioning of Large-Scale Virtual Machine Clusters, IEEE Transactions on Parallel and Distributed Systems, vol. 25, No. 12, Dec. 2014, pp. 3328-3338.
Zheng, C., and D. Thain, Integrating Containers into Workflows: A Case Study Using Makeflow, Work Queue, and Docker, VTDC '15, Jun. 15, 2015, Portland, Oregon, pp. 31-38.
International Search Report and Written Opinion in PCT/US2015/052810 dated Dec. 17, 2015.
International Preliminary Report on Patentability in PCT/US2015/052810 dated Apr. 4, 2017.
Extended Search Report in European Application No. 15846932.0 dated May 3, 2018.
International Search Report and Written Opinion in PCT/US2015/052838 dated Dec. 18, 2015.
International Preliminary Report on Patentability in PCT/US2015/052838 dated Apr. 4, 2017.
Extended Search Report in European Application No. 15847202.7 dated Sep. 9, 2018.
Extended Search Report in European Application No. 19199402.9 dated Mar. 6, 2020.
International Search Report and Written Opinion in PCT/US2015/052833 dated Jan. 13, 2016.
International Preliminary Report on Patentability in PCT/US2015/052833 dated Apr. 4, 2017.
Extended Search Report in European Application No. 15846542.7 dated Aug. 27, 2018.
International Search Report and Written Opinion in PCT/US2015/064071dated Mar. 16, 2016.
International Preliminary Report on Patentability in PCT/US2015/064071 dated Jun. 6, 2017.
International Search Report and Written Opinion in PCT/US2016/016211 dated Apr. 13, 2016.
International Preliminary Report on Patentability in PCT/US2016/016211 dated Aug. 17, 2017.
European Examination Report, re EP Application No. 17743108.7, dated Oct. 12, 2022.
International Search Report and Written Opinion in PCT/US2016/026514 dated Jun. 8, 2016.
International Preliminary Report on Patentability in PCT/US2016/026514 dated Oct. 10, 2017.
International Search Report and Written Opinion in PCT/US2016/026520 dated Jul. 5, 2016.
International Preliminary Report on Patentability in PCT/US2016/026520 dated Oct. 10, 2017.
International Search Report and Written Opinion in PCT/US2016/054774 dated Dec. 16, 2016.
International Preliminary Report on Patentability in PCT/US2016/054774 dated Apr. 3, 2018.
International Search Report and Written Opinion in PCT/US2016/066997 dated Mar. 20, 2017.
International Preliminary Report on Patentability in PCT/US2016/066997 dated Jun. 26, 2018.
International Search Report and Written Opinion in PCT/US/2017/023564 dated Jun. 6, 2017.
International Preliminary Report on Patentability in PCT/US/2017/023564 dated Oct. 2, 2018.
International Search Report and Written Opinion in PCT/US2017/040054 dated Sep. 21, 2017.
International Preliminary Report on Patentability in PCT/US2017/040054 dated Jan. 1, 2019.
International Search Report and Written Opinion in PCT/US2017/039514 dated Oct. 10, 2017.
International Preliminary Report on Patentability in PCT/US2017/039514 dated Jan. 1, 2019.
Extended European Search Report in application No. 17776325.7 dated Oct. 23, 2019.
International Search Report and Written Opinion mailed Oct. 15, 2019 for International Application No. PCT/US2019/039246 in 16 pages.
International Preliminary Report on Patentability mailed Dec. 29, 2020 for International Application No. PCT/US2019/039246 in 8 pages.
International Search Report for Application No. PCT/US2019/038520 dated Aug. 14, 2019.
International Preliminary Report on Patentability for Application No. PCT/US2019/038520 dated Dec. 29, 2020.

(56) References Cited

OTHER PUBLICATIONS

International Preliminary Report on Patentability and Written Opinion in PCT/US2019/053123 dated Mar. 23, 2021.
International Search Report and Written Opinion in PCT/US2019/053123 dated Jan. 7, 2020.
International Search Report for Application No. PCT/US2019/065365 dated Mar. 19, 2020.
International Preliminary Report on Patentability for Application No. PCT/US2019/065365 dated Jun. 8, 2021.
International Search Report for Application No. PCT/US2020/039996 dated Oct. 8, 2020.
International Preliminary Report on Patentability for Application No. PCT/US2020/039996 dated Jan. 6, 2022.
International Search Report for Application No. PCT/US2020/062060 dated Mar. 5, 2021.
International Preliminary Report on Patentability for Application No. PCT/US2020/062060 dated Jun. 9, 2022 in 9 pages.

\* cited by examiner

ARCHITECTURE FOR SELECTIVE USE OF PRIVATE PATHS BETWEEN CLOUD SERVICES

BACKGROUND

Computing systems can utilize communication networks to exchange data. In some implementations, a computing system can receive and process data provided by another computing system. For example, a computing system can receive data entered using another computing system, store the data, process the data, and so on.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

DETAILED DESCRIPTION

Figure 1:
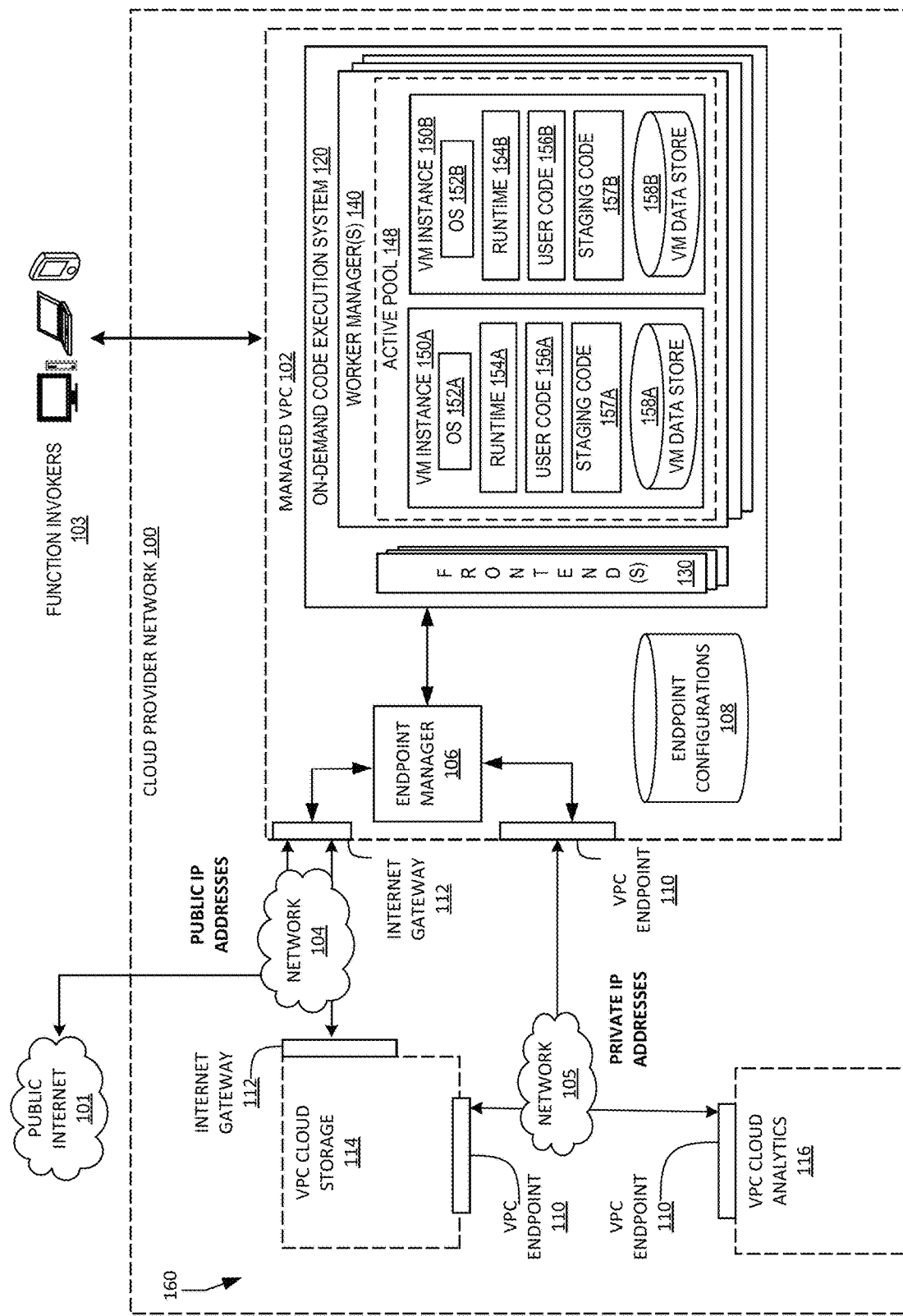
FIG. 1 is a block diagram of a cloud provider network in which a managed VPC operates an endpoint manager to selectively use private paths for communications from user-defined code executing in an on-demand code execution system according to some embodiments.

The present disclosure relates to selectively directing traffic from an on-demand code execution system using a private, secure path (e.g., a non-public path within a managed network infrastructure or otherwise using a private internet protocol (IP) address that is not visible to the public internet), or permitting the traffic to be routed using a public or unsecured path (e.g., a route over the public internet or otherwise using a public IP address). As used herein, the terms "private path" and "secure path" are used interchangeably to refer to sending packets using IP addresses for source and destination that are not public IP addresses, and to using routes that do not have connectivity outside of the managed network infrastructure (e.g., sending packets though a gateway without access to the public internet). The terms "unsecured path" and "public path" are used interchangeably to refer to sending packets using IP addresses for both source and destination that are public IP addresses (e.g., IP addresses accessible via the public internet), or to otherwise using routes that have connectivity outside of the managed network infrastructure (e.g., through a gateway with access to the public internet).

The on-demand code execution system can allow function invokers or function owners to opt-in to using only private paths for communications from an invoked function to an endpoint outside of the on-demand code execution system, such as to a managed storage or computing service operating within the same managed network infrastructure as the on-demand code execution system. During subsequent execution of a function owned by a function owner or invoked by a function invoker who has opted-in to using only private communication paths, the on-demand code execution system can ensure that traffic from the invoked function to the managed storage or computing service is routed through a private path. In one embodiment, an endpoint manager within the on-demand code execution system can intercept this traffic and utilize a Domain Name System (DNS) resolver to determine whether to route the traffic to a secure virtual private cloud (VPC) endpoint through which the traffic will be securely communicated to the destination endpoint, or to permit the traffic to take an unsecured path (e.g., via the public internet or otherwise using a public IP address). In another embodiment, the endpoint manager can configure computing components of the on-demand code execution system (e.g., virtual machines that will execute the function owner's or function invoker's function) such that a mapping of the managed storage or computing service to an IP address of a private endpoint is injected into the computing components prior to (or concurrently with) function invocation.

INTRODUCTION

Some data centers may include a number of interconnected computing systems to provide computing resources to users of the data center. To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request compute resources from such a data center, including single computing devices or a configuration of networked computing devices, and be provided with varying numbers of virtual machine resources.

Some data centers include an on-demand code execution system, sometimes referred to as a serverless function execution system. Generally described, on-demand code execution systems enable execution of arbitrary user-designated function code, without requiring the user to create, maintain, or configure an execution environment (e.g., a physical or virtual machine) in which the function code is executed. For example, whereas conventional computing services often require a user to provision a specific device (virtual or physical), install an operating system on the device, configure application settings, define network interfaces, and so on, an on-demand code execution system may enable a user to submit code and may provide to the user an application programming interface (API) that, when used, enables the user to request execution of the function code. Upon receiving a call through the API, the on-demand code execution system may dynamically generate an execution environment for the code, provision the environment with the code, execute the code, and provide a result. Thus, an on-demand code execution system can remove a need for a user to handle configuration and management of environments for code execution. Due to the flexibility of on-demand code execution system to execute arbitrary function code, such a system can be used to create a variety of network services. For example, such a system could be used to create a "micro-service," a network service that implements a small number of functions (or only one function), and that interacts with other services to provide an application. In the context of on-demand code execution systems, the instance of function code executing to provide such a service is often referred to as an "invoked function," or simply as an "invoke" or "function" for brevity.

Function invokers can invoke functions on the on-demand code execution system (e.g., through different computing devices, etc.). When the function invokers invoke functions on the on-demand code execution system, the on-demand code execution system may execute these functions to completion and, in some cases, provide the function invoker results of the execution. As the on-demand code execution system executes code associated with a function, various communications may be initiated to endpoints outside of the on-demand code execution system. For example, a function may access or store data on a network-based data storage service, request execution of an application hosted on a network-based compute service, or the like. Such services are referred to herein as "network-based" to contrast them from local storage and compute resources available on a local device or otherwise within the on-demand code execution system on which a function is executing. In some cases, even if the network-based services are hosted on the same managed network infrastructure as the on-demand code execution system, the network-based services may be publicly-accessible (e.g., may have network addresses accessible via the public internet). As a result, traffic (e.g., network packets) associated with the executed code may travel paths accessible outside the managed network infrastructure (e.g., through gateways with access to the public internet) even if the traffic is being communicated to network-based services or other destinations that are also within the same managed network infrastructure. In some cases, the on-demand code execution system may route the traffic through a path including the public internet, where information associated with the traffic (e.g., packets) may be vulnerable to interception and/or pose other security related concerns (e.g., traffic unintentionally broadcast to parties who are not authorized).

Some aspects of the present disclosure address some or all of the issues noted above, among others, by providing an improved on-demand code execution system and an endpoint manager configured to selectively use private paths and isolate traffic from the public internet. The endpoint manager can assist in routing traffic of the on-demand code execution system (e.g., after/before/during a function invocation by a function invoker) over a managed infrastructure path that extends from the on-demand code execution system to the destination address. In some embodiments, a private endpoint such as a VPC endpoint can be attached to a VPC in which the on-demand code execution system is implemented. The VPC endpoint may be configured to communicate only with other endpoints within the managed infrastructure (e.g., the VPC endpoint may not have access to direct packets out over—or to receive packets from—the public internet). For example, the VPC endpoint may only have access to routing data for components within the managed infrastructure via a private IP address (e.g., not visible to the public internet). Thus, outgoing traffic from an invoked function can be routed via the VPC endpoint in order to provide a level of assurance that information associated with the traffic will not be sent to or from a public IP address.

In some cases, function invokers may prefer that only certain function-initiated traffic be routed to a VPC endpoint while allowing other traffic to be sent using public IP addresses (e.g., based on how sensitive the information is, among other factors). Therefore, the endpoint manager can offer function invokers the ability to either opt-in or opt-out of having their function-initiated traffic be sent through a VPC endpoint on a destination-service-specific basis, rather than requiring all function-initiated traffic being sent through a VPC endpoint.

After a function invoker or function owner opts into enforcement of private communication paths (e.g., non-public communication paths, such as paths not including public IP addresses) for traffic originating from their functions, the managed VPC can automatically route function-initiated traffic associated with the opt-in to the VPC endpoint and avoid at least the issues posed with routing traffic using public IP addresses. Moreover, function invokers are relieved of the tasks of managing their own private path (e.g., setting up and maintaining their own VPC with a VPC endpoint) since the on-demand code execution system managed VPC can securely route their function-initiated traffic automatically over a private path after opting in.

In some embodiments herein, a VPC represents a logically-isolated pool of computing resources within a physical cloud provider managed network infrastructure. In some embodiments, different VPCs may be associated with different accounts of the cloud provider network, providing additional separation and distinction between VPCs.

In one embodiment, an on-demand code execution system can be implemented within a VPC of the cloud provider network. The VPC may include an endpoint manager configured to implement aspects of the present disclosure. The endpoint manager can intercept function-initiated traffic and direct such traffic to over a private path. For example, a function invoker may opt-in to having its traffic being routed over private paths for certain functions and the managed VPC may utilize a DNS resolver configured to ensure that the DNS resolution traffic associated with those functions is assigned a private IP address such that the traffic is routed through the VPC endpoint (e.g., not visible to the public internet). In this example, when the function invoker invokes a function (e.g., for which the function invoker opted in to use of the VPC endpoint) via the on-demand code execution system, the DNS resolver can return the IP address of the VPC endpoint for DNS requests associated with all outgoing traffic from the opted-in function. This has the effect of redirecting the traffic to the VPC endpoint. Because the VPC endpoint does not have access to the public internet, this ensures a private communication path to a destination endpoint.

In another embodiment, the endpoint manager can inject data into a local DNS server or DNS cache on a virtual machine associated with an invoked function to ensure that traffic associated with that invoked function is sent over a private path. For example, a function invoker may opt-in to having its traffic being routed to a VPC endpoint for certain functions and the managed VPC may utilize a micro virtual machine (VM) manager to inject DNS entries (e.g., via "dnsmasq") into the VMs for those functions. The DNS entries may map network-accessible services to the private IP address of the VPC endpoint, rather than to a publicly-accessible IP address that is reachable via the public internet. In this example, when the function invoker invokes a function via the on-demand code execution system, the VM associated with the opted-in function can be provisioned with one or more DNS records configured to ensure any traffic associated with that function is routed to a VPC endpoint for a private path (e.g., private IP address not visible to the public internet). The DNS records may map network-accessible services to the IP address of the VPC endpoint, rather than to a publicly-accessible IP address that is reachable via the public internet.

Advantageously, via at least the embodiments descried herein, a function invoker can receive the benefits of a private communication path between different cloud services through use of an endpoint manager. Moreover, since the managed VPC which comprises the endpoint manager can maintain all the configurations (e.g., whether a function invoker or function owner opted in) and the technical infrastructure (e.g., network connections, computing systems, software, VPCs, VPC endpoints, etc.) that allows routing of function-initiated traffic through a private path, a function invoker or function owner is not burdened with maintaining such configurations and technical infrastructure itself.

Various aspects of the disclosure will be described with regard to certain examples and embodiments, which are intended to illustrate but not limit the disclosure. Although aspects of some embodiments described in the disclosure will focus, for the purpose of illustration, on particular examples of on-demand functions, DNS resolvers, local DNS servers and caches, VPC endpoints, and on-demand code execution system configurations, the examples are illustrative only and are not intended to be limiting. In some embodiments, the techniques described herein may be applied to additional or alternative types of on-demand functions, DNS resolvers, local DNS servers and caches, VPC endpoints, and on-demand code execution system configurations. Additionally, any feature used in any embodiment described herein may be used in any combination with any other feature or in any other embodiment, without limitation.

Example Network Environment

An on-demand code execution system may provide a network-accessible service enabling users to submit or designate computer-executable source code—also referred to herein as "function code," or simply as "code" for brevity—to be executed by virtual machine instances on the on-demand code execution system. Each set of function code on the on-demand code execution system may define a "task," and implement specific functionality corresponding to that task when executed on a virtual machine instance of the on-demand code execution system. Individual implementations of the task on the on-demand code execution system may be referred to as an "execution" of the task (or a "task execution"). In some cases, the on-demand code execution system may enable users to directly trigger execution of a task based on a variety of potential events, such as transmission of an API or specially formatted hypertext transport protocol ("HTTP") packet to the on-demand code execution system. The on-demand code execution system can therefore execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user). To enable this rapid execution, the on-demand code execution system can include one or more virtual machine instances that are "pre-warmed" or pre initialized (e.g., booted into an operating system and executing a complete or substantially complete runtime environment) and configured to enable execution of user-defined code, such that the code may be rapidly executed in response to a request to execute the code, without delay caused by initializing the virtual machine instance. Thus, when an execution of a task is triggered, the code corresponding to that task can be executed within a pre-initialized virtual machine in a very short amount of time.

Specifically, to execute tasks, the on-demand code execution system described herein may maintain a pool of executing virtual execution environments (e.g., virtual machine instances and/or containers) that are ready for use as soon as a request to execute a task is received. Due to the pre initialized nature of these virtual execution environments, delay (sometimes referred to as latency) associated with executing the task code (e.g., instance and language runtime startup time) can be significantly reduced, often to sub 100 millisecond levels. Illustratively, the on-demand code execution system may maintain a pool of virtual execution environments on one or more physical computing devices, where each virtual machine instance has one or more software components (e.g., operating systems, language runtimes, libraries, etc.) loaded thereon. When the on-demand code execution system receives a request to execute program code (a "task"), the on-demand code execution system may select a virtual execution environment for executing the program code of the user based on the one or more computing constraints related to the task (e.g., a required operating system or runtime) and cause the task to be executed on the selected virtual machine instance. The tasks can be executed in isolated containers that are created on the virtual machine instances, or may be executed within a virtual machine instance isolated from other virtual machine instances acting as environments for other tasks. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) can be significantly reduced.

As used herein, the term "virtual machine instance" is intended to refer to an execution of software or other executable code that emulates hardware to provide an environment or platform on which software may execute (an example "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments (e.g., other virtual execution environments or physical environments) are also possible. For example, tasks or other processes may be executed within a software "container," which provides a runtime environment without itself providing virtualization of hardware. Containers may be implemented within virtual machines to provide additional security, or may be run outside of a virtual machine instance.

FIG. 1 is a block diagram of a cloud provider network 100 in which a managed VPC 102 operates an endpoint manager 106. The endpoint manager 106 enables function-initiated traffic (e.g., via an on-demand code execution system 120) to be routed through a private path to network-based services 160 (e.g., VPC cloud storage 114 and/or VPC cloud analytics 116).

By way of illustration, function invokers 103 are shown in communication with the managed VPC 102, including a desktop computer, laptop, and a mobile phone. In general, the function invokers 103 can be any computing device such as a desktop, laptop or tablet computer, personal computer, wearable computer, server, personal digital assistant (PDA), hybrid PDA/mobile phone, mobile phone, electronic book reader, set top box, voice command device, camera, digital media player, and the like.

Generally described, network-based services 160 can operate to enable the function invokers 103 to gain access to cloud-based products (e.g., cloud compute instances, cloud storage, cloud databases, cloud networking and content delivery, cloud based artificial intelligence (AI) services, etc.). Network-based services 160 may also be referred to as "managed services" or "cloud services." For example, the VPC cloud storage 114 can operate to enable clients (e.g., the function invokers 103) to remotely read, write, modify, and delete data, such as files, objects, blocks, or records, each of which represents a set of data associated with an identifier (an "object identifier" or "resource identifier") that can be interacted with as an individual resource. An object may represent a single file submitted by a client device (though the VPC cloud storage 114 may or may not store such an object as a single file). This object-level interaction can be contrasted with other types of storage services, such as block-based storage in which data is manipulated at the level of individual blocks or database storage in which data manipulation may occur at the level of tables or the like. As another example, the VPC cloud analytics 116 can operate to enable clients to remotely access analytics services (e.g., big data analytics, log analytics, streaming analytics, etc.). As such, the VPC cloud analytics 116 may allow clients the ability to extract insights from different types of data.

The function invokers 103, VPC cloud storage 114, VPC cloud analytics 116, and on-demand code execution system 120 may communicate via one or more communication networks, which may include any wired network, wireless network, or combination thereof. For example, networks 104 or 105 (also described collectively as "the networks") may be a personal area network, local area network, wide area network, satellite network, or combination thereof. In some embodiments, the networks may be a private or semi-private network, such as a corporate or university intranet. The networks can use protocols and components for communicating, such as Hypertext Transfer Protocol (HTTP), HTTP Secure (HTTPS), Message Queue Telemetry Transport (MQTT), Constrained Application Protocol (CoAP), and the like. Protocols and components for communicating via communication networks are well known to those skilled in the art and, thus, are not described in more detail herein.

In some embodiments, as shown, a network such as network 104 may be in communication with or otherwise have access to a network outside of the cloud provider network 100 managed network infrastructure. For example, network 104 may have access to a publicly-accessible network of linked networks, possibly operated by various distinct parties, such as the public internet 101. To send traffic over and receive traffic via the public internet 101, a public IP address is used. Thus, the public internet 101 is not directly accessible via network 105, because network 105 is only in communication with VPC endpoints 110 within the cloud provider network 100 managed network infrastructure, rather than internet gateways 112 that are in communication with the public internet as described in greater detail below.

The on-demand code execution system 120 may be connected to the VPC cloud storage 114 or the VPC cloud analytics 116 via either by the network 104 or the network 105. As shown in FIG. 1, the on-demand code execution system 120 may connect to the VPC cloud storage 114 via the network 104 which uses a public IP address. Also shown is that the on-demand code execution system 120 may connect to both the VPC cloud storage 114 and the VPC cloud analytics 116 via the network 105 which provides a private path (e.g., entirely within the cloud provider network 100) such that any communications between these systems are transacted privately (e.g., the packets do not use public IP addresses).

The on-demand code execution system 120—also referred to as an on-demand code execution service—includes one or more frontends 130 which enable interaction with the on-demand code execution system 120. In an illustrative embodiment, the frontends 130 serve as a "front door" to the other services provided by the on-demand code execution system 120, enabling function invokers 103 to provide, request execution of, and view results of computer executable code. The frontends 130 include a variety of components to enable interaction between the on-demand code execution system 120 and other computing devices. For example, each frontend 130 may include a request interface providing function invokers 103 with the ability to upload or otherwise communicate user-specified code to the on-demand code execution system 120 and to thereafter request execution of that code. In one embodiment, the request interface communicates with external computing devices (e.g., function invokers 103, frontend 130, etc.) via a graphical user interface (GUI), CLI, or API. The frontends 130 process the requests and make sure that the requests are properly authorized. For example, the frontends 130 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," "function code," and "program code," may be used interchangeably. Such user code may be executed to achieve a specific function, for example, in connection with a particular data transformation developed by the user. As noted above, individual collections of user code (e.g., to achieve a specific function) are referred to herein as "tasks," while specific executions of that code (including, e.g., compiling code, interpreting code, or otherwise making the code executable) are referred to as "task executions" or simply "executions." Tasks may be written, by way of non-limiting example, in JavaScript (e.g., node.js), Java, Python, or Ruby (or another programming language).

To manage requests for code execution, the frontend 130 can include an execution queue, which can maintain a record of requested task executions. Illustratively, the number of simultaneous task executions by the on-demand code execution system 120 is limited, and as such, new task executions initiated at the on-demand code execution system 120 (e.g., via an API call, via a call from an executed or executing task, etc.) may be placed on the execution queue and processed, e.g., in a first-in-first-out order. In some embodiments, the on-demand code execution system 120 may include multiple execution queues, such as individual execution queues for each user account. For example, users of the cloud provider network 100 may desire to limit the rate of task executions on the on-demand code execution system 120 (e.g., for cost reasons). Thus, the on-demand code execution system 120 may utilize an account-specific execution queue to throttle the rate of simultaneous task executions by a specific user account. In some instances, the on-demand code execution system 120 may prioritize task executions, such that task executions of specific accounts or of specified priorities bypass or are prioritized within the execution queue. In other instances, the on-demand code execution system 120 may execute tasks immediately or substantially immediately after receiving a call for that task, and thus, the execution queue may be omitted.

The frontend 130 can further include an output interface configured to output information regarding the execution of tasks on the on-demand code execution system 120. Illustratively, the output interface may transmit data regarding task executions (e.g., results of a task, errors related to the task execution, or details of the task execution, such as total time required to complete the execution, total data processed via the execution, etc.) to the function invokers 103.

In some embodiments, the on-demand code execution system 120 may include multiple frontends 130. In such embodiments, a load balancer may be provided to distribute the incoming calls to the multiple frontends 130, for example, in a round-robin fashion. In some embodiments, the manner in which the load balancer distributes incoming calls to the multiple frontends 130 may be based on the location or state of other components of the on-demand code execution system 120. For example, a load balancer may distribute calls to a geographically nearby frontend 130, or to a frontend with capacity to service the call. In instances where each frontend 130 corresponds to an individual instance of another component of the on-demand code execution system 120, such as the active pool 148 described below, the load balancer may distribute calls according to the capacities or loads on those other components. Calls may in some instances be distributed between frontends 130 deterministically, such that a given call to execute a task will always (or almost always) be routed to the same frontend 130. This may, for example, assist in maintaining an accurate execution record for a task, to ensure that the task executes only a desired number of times. For example, calls may be distributed to load balance between frontends 130. Other distribution techniques, such as anycast routing, will be apparent to those of skill in the art.

The on-demand code execution system 120 further includes one or more worker managers 140 that manage the execution environments, such as virtual machine instances 150 (shown as VM instance 150A and 150B, generally referred to as a "VM"), used for servicing incoming calls to execute tasks. While the following will be described with reference to virtual machine instances 150 as examples of such environments, embodiments of the present disclosure may utilize other environments, such as software containers. In the example illustrated in FIG. 1, each worker manager 140 manages an active pool 148, which is a group (sometimes referred to as a pool) of virtual machine instances 150 executing on one or more physical host computing devices that are initialized to execute a given task (e.g., by having the code of the task and any dependency data objects loaded into the instance).

Although the virtual machine instances 150 are described here as being assigned to a particular task, in some embodiments, the instances may be assigned to a group of tasks, such that the instance is tied to the group of tasks and any tasks of the group can be executed within the instance. For example, the tasks in the same group may belong to the same security group (e.g., based on their security credentials) such that executing one task in a container on a particular instance 150 after another task has been executed in another container on the same instance does not pose security risks. A task may be associated with permissions encompassing a variety of aspects controlling how a task may execute. For example, permissions of a task may define what network connections (if any) can be initiated by an execution environment of the task. As another example, permissions of a task may define what authentication information is passed to a task, controlling what network-accessible resources are accessible to execution of a task (e.g., network-based services 160). In one embodiment, a security group of a task is based on one or more such permissions. For example, a security group may be defined based on a combination of permissions to initiate network connections and permissions to access network resources. As another example, the tasks of the group may share common dependencies, such that an environment used to execute one task of the group can be rapidly modified to support execution of another task within the group.

Once a triggering event to execute a task has been successfully processed by a frontend 130, the frontend 130 passes a request to a worker manager 140 to execute the task. In one embodiment, each frontend 130 may be associated with a corresponding worker manager 140 (e.g., a worker manager 140 co-located or geographically nearby to the frontend 130) and thus, the frontend 130 may pass most or all requests to that worker manager 140. In another embodiment, a frontend 130 may include a location selector configured to determine a worker manager 140 to which to pass the execution request. In one embodiment, the location selector may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

Thereafter, the worker manager 140 may modify a virtual machine instance 150 (if necessary) and execute the code of the task within the instance 150. As shown in FIG. 1, respective instances 150 may have operating systems (OS) 152 (shown as OS 152A and 152B), language runtimes 154 (shown as runtime 154A and 154B), and user code 156 (shown as user code 156A and 156B). The OS 152, runtime 154, and user code 156 may collectively enable execution of the user code to implement the task. Thus, via operation of the on-demand code execution system 120, tasks may be rapidly executed within an execution environment.

In accordance with aspects of the present disclosure, each VM 150 additionally includes staging code 157 executable to facilitate staging of input data on the VM 150 and handling of output data written on the VM 150, as well as a VM data store 158 accessible through a local file system of the VM 150. Illustratively, the staging code 157 represents a process executing on the VM 150 (or potentially a host device of the VM 150) and configured to obtain data from the network-based services 160 and place that data into the VM data store 158. The staging code 157 can further be configured to obtain data written to a file within the VM data store 158, and to transmit that data to the network-based services 160. Because such data is available at the VM data store 158, user code 156 is not required to obtain data over a network, simplifying user code 156 and enabling further restriction of network communications by the user code 156, thus increasing security. Rather, as discussed above, user code 156 may interact with input data and output data as files on the VM data store 158, by use of file handles passed to the code 156 during an execution. In some embodiments, input and output data may be stored as files within a kernel-space file system of the data store 158. In other instances, the staging code 157 may provide a virtual file system, such as a filesystem in userspace (FUSE) interface, which provides an isolated file system accessible to the user code 156, such that the user code's access to the VM data store 158 is restricted.

As used herein, the term "local file system" generally refers to a file system as maintained within an execution environment, such that software executing within the environment can access data as a file, rather than via a network connection. In accordance with aspects of the present disclosure, the data storage accessible via a local file system may itself be local (e.g., local physical storage), or may be remote (e.g., accessed via a network protocol, like NFS, or represented as a virtualized block device provided by a network-accessible service). Thus, the term "local file system" is intended to describe a mechanism for software to access data, rather than physical location of the data.

The VM data store 158 can include any persistent or non-persistent data storage device. In one embodiment, the VM data store 158 is physical storage of the host device, or a virtual disk drive hosted on physical storage of the host device. In another embodiment, the VM data store 158 is represented as local storage, but is in fact a virtualized storage device provided by a network accessible service. For example, the VM data store 158 may be a virtualized disk drive provided by a network-accessible block storage service. In some embodiments, the network-based services 160 may be configured to provide file-level access to objects stored on the data stores 158, thus enabling the VM data store 158 to be virtualized based on communications between the staging code 157 and the network-based service 160. For example, the network-based services 160 can include a file-level interface providing network access to objects within the data stores 158 as files. The file-level interface may, for example, represent a network-based file system server (e.g., a network file system (NFS)) providing access to objects as files, and the staging code 157 may implement a client of that server, thus providing file-level access to objects of the network-based service 160.

In some instances, the VM data store 158 may represent virtualized access to another data store executing on the same host device of a VM instance 150. For example, an active pool 148 may include one or more data staging VM instances (not shown in FIG. 1), which may be co-tenanted with VM instances 150 on the same host device. A data staging VM instance may be configured to support retrieval and storage of data from the network-based service 160 (e.g., data objects or portions thereof, input data passed by function invokers 103, etc.), and storage of that data on a data store of the data staging VM instance. The data staging VM instance may, for example, be designated as unavailable to support execution of user code 156, and thus be associated with elevated permissions relative to instances 150 supporting execution of user code. The data staging VM instance may make this data accessible to other VM instances 150 within its host device (or, potentially, on nearby host devices), such as by use of a network-based file protocol, like NFS. Other VM instances 150 may then act as clients to the data staging VM instance, enabling creation of virtualized VM data stores 158 that, from the point of view of user code 156A, appear as local data stores. Beneficially, network-based access to data stored at a data staging VM can be expected to occur very quickly, given the co-location of a data staging VM and a VM instance 150 within a host device or on nearby host devices.

While some examples are provided herein with respect to use of IO stream handles to read from or write to a VM data store 158, IO streams may additionally be used to read from or write to other interfaces of a VM instance 150 (while still removing a need for user code 156 to conduct operations other than stream-level operations, such as creating network connections). For example, staging code 157 may "pipe" input data to an execution of user code 156 as an input stream, the output of which may be "piped" to the staging code 157 as an output stream. As another example, a staging VM instance or a hypervisor to a VM instance 150 may pass input data to a network port of the VM instance 150, which may be read-from by staging code 157 and passed as an input stream to the user code 157. Similarly, data written to an output stream by the task code 156 may be written to a second network port of the instance 150A for retrieval by the staging VM instance or hypervisor. In yet another example, a hypervisor to the instance 150 may pass input data as data written to a virtualized hardware input device (e.g., a keyboard) and staging code 157 may pass to the user code 156 a handle to the IO stream corresponding to that input device. The hypervisor may similarly pass to the user code 156 a handle for an IO stream corresponding to a virtualized hardware output device, and read data written to that stream as output data. Thus, the examples provided herein with respect to file streams may generally be modified to relate to any IO stream.

The network-based services 160 and on-demand code execution system 120 are depicted in FIG. 1 as operating in a distributed computing environment including several computer systems that are interconnected using one or more computer networks (e.g., network 105). The network-based services 160 and on-demand code execution system 120 could also operate within a computing environment having a fewer or greater number of devices than are illustrated in FIG. 1. Thus, the depiction of the network-based services 160 and on-demand code execution system 120 in FIG. 1 should be taken as illustrative and not limiting to the present disclosure.

The endpoint manager 106 can either intercept DNS requests associated with a function or inject DNS entries (e.g., via a dnsmasq) into a local DNS server or DNS cache on a VM associated with the function to provide a private path for the traffic when the traffic travels to cloud services such as VPC cloud storage 114 and VPC cloud analytics 116 (e.g., or other network-based services 160 such as AI services, etc.). As shown in FIG. 1, the endpoint manager 106 can help determine whether the traffic should be routed to a VPC endpoint 110 (e.g., a type of private path) or whether the traffic should be routed to an internet gateway 112 (e.g., using a public IP address).

In one embodiment, the endpoint manager 106 may intercept the traffic associated with the function by using a DNS resolver. If using a DNS resolver, the endpoint manager 106 may evaluate DNS requests associated with the function (e.g., from a VM associated with the function) to see if a function invoker 103, who invoked the function, opted into routing function-initiated traffic through a private path (e.g., VPC endpoint 110 using a private IP address not visible to the public internet). If the function invoker 103 opted in, the DNS resolver may return (e.g., as a response to a DNS request and to a VM associated with the function) a private IP address of the VPC endpoint 110. Thus, when the VM associated with the function sends traffic to network-based services 160 (e.g., the VPC cloud storage 114, etc.), it can send such traffic using the private IP address of the VPC endpoint 110. If the function invoker 103 did not opt-in, the DNS resolver may return (e.g., as a response to a DNS request and to a VM associated with the function) a public IP address of the internet gateway 112. Thus, when the VM associated with the function sends traffic to network-based services 160 (e.g., the VPC cloud analytics 116, etc.), it can send such traffic using the public IP address of the internet gateway 112.

In some embodiments, the endpoint manager 106 may utilize a micro VM manager to inject data into a local DNS server or DNS cache on a VM associated with an invoked function. For example, the endpoint manager 106 may utilize the micro VM manager to inject DNS entries (e.g., DNS entries mapping a network-based service to an IP address) into a component running on (e.g., dnsmasq), or associated with, a VM instance and/or container that was created and/or assigned to the invoked function. As a result, any traffic leaving from the VM instance and/or container to a network-based service is sent to the assigned IP address. If the function invoker 103 opted into routing function-initiated traffic through a private path (e.g., VPC endpoint 110), the micro VM manager may inject DNS entries (e.g., with the IP address of the VPC endpoint 110) to a component of the VM instance and/or container to route traffic to a private path. Additionally, if the function invoker 103 did not opt-in, the micro VM manager may inject DNS entries (e.g., with the public IP address of the internet gateway 112) to a component of the VM instance and/or container to route traffic to an unsecure path (e.g., using a public IP address). Therefore, based on whether the function invoker 103 opted in or opted out, when the VM instance and/or container has traffic destined for network-based services, DNS entries may be injected into a component (e.g., dnsmasq) of the VM instance and/or container to set an IP address of where the traffic should be routed to automatically (e.g., to the VPC endpoint 110 (opted in) or to the internet gateway 112 (opted out)).

As shown in FIG. 1, the VPC endpoint 110 and the internet gateway 112 provide can provide either a private path, or routing of function-initiated traffic through an unsecure public IP address, respectively. If the traffic of the invoked function is routed to the internet gateway 112 (e.g., via a public IP address of the internet gateway 112), the traffic of the invoked function may pass through the network 104 but using a public IP address of a cloud service (e.g., the VPC cloud storage 114). If the traffic of the invoked function is routed to the VPC endpoint 110, the traffic of the invoked function may pass through the network 105 via a private path (e.g., using a private IP address while entirely within the cloud provider network 100 without reaching the public internet, possibly using SSL, Transport Layer Security (TLS), or HTTPS, etc. for connection security) to a cloud service (e.g., the VPC cloud storage 114 and/or VPC cloud analytics 116). As such, using the VPC endpoint 110, the traffic may be more protected from security issues that would otherwise arise when using the internet gateway 112. Moreover, the endpoint manager 106 also can include an endpoint configurations data store 108 that can store whether a function invoker 103 opted in or opted out regarding a private path.

Routing of Traffic by a DNS Resolver or by Injecting DNS Entries

Figure 2:
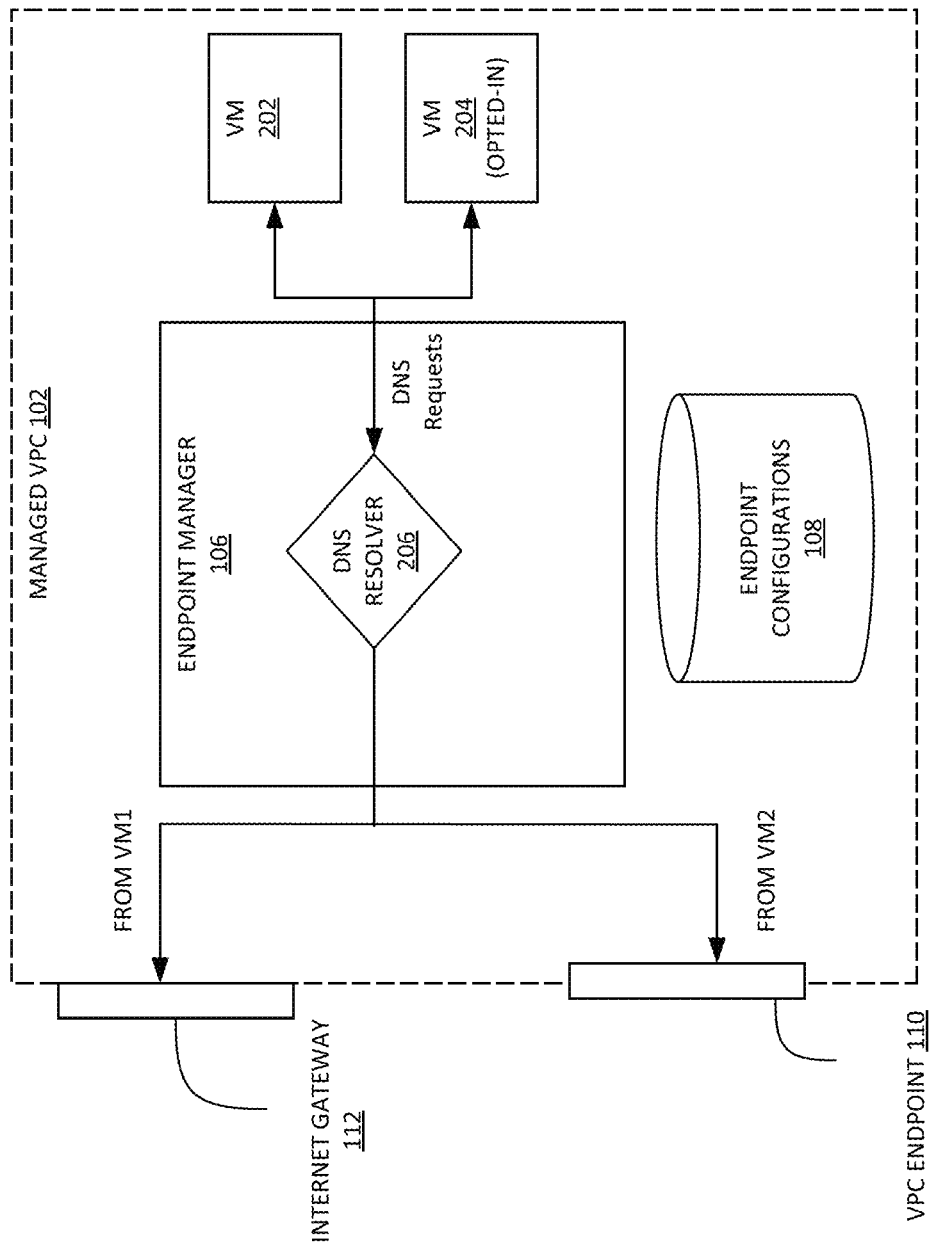
FIG. 2 is a block diagram of a managed virtual private cloud (VPC) where communications from functions invoked via the on-demand code execution system can be routed securely to cloud services by a Domain Name System (DNS) resolver according to some embodiments.

FIG. 2 is a block diagram of a managed VPC 102 where traffic from function invocations via the on-demand code execution system 120 can be routed securely to cloud services by a DNS resolver 206. In some embodiments, as shown, the managed VPC 102 includes an endpoint manager 106, a DNS resolver 206, and endpoint configurations data store 108. Described in more detail below, the DNS resolver 206 can intercept DNS requests of VMs associated with function invokers 103. After intercepting the DNS requests, the DNS resolver 206 can check to see if the function invokers 103 opted in concerning a private path and then return a DNS response with associated IP addresses (e.g., of either a private path or unsecure path), based on whether a function invoker 103 opted in.

As shown in FIG. 2, VM 202 and VM 204 make DNS requests to the endpoint manager 106 which can be intercepted by the DNS resolver 206. After receiving the DNS requests, the DNS resolver 206 may check to see which function invoker 103 made the DNS request via their VM. Once determining the function invoker 103, the DNS resolver 206 may then reference the endpoint configurations data store 108 to determine whether the function invoker 103 opted for a private path. For example, the DNS resolver may reference the endpoint configurations data store 108 and determine that a first function invoker 103 associated with VM 202 opted out of (or did not opt into) using a private path and a second function invoker 103 associated with VM 204 opted in to (or did not opt out of) using a private path, for communicating with cloud services (e.g., VPC cloud storage 114 and VPC cloud analytics 116, etc.) concerning their function-initiated traffic. A described herein, the opt-in and the opt-out settings of the first function invoker and the second function invoker, respectively, can be stored in the endpoint configurations data store 108 such that the endpoint manager 106 may retrieve these settings when needed.

The DNS resolver 206 may then respond and/or reply to the DNS request (e.g., by the VM) with DNS entries which may have the IP address of the endpoint to which the VM may route function-initiated traffic. For example, due to the first function invoker 103 opting out of having a private path in this example, when the VM associated with the first function invoker 103 makes a DNS request, the DNS request will be intercepted by the DNS resolver 206 within the endpoint manager 106. The DNS resolver may then determine that the first function invoker 103 opted out of a private path and then send a response (e.g., to the VM) with DNS entries which may have the IP address of the unsecure path (e.g., the internet gateway 112). The VM may then associate the IP address of the unsecure path with traffic leaving the VM. As such, when the VM routes traffic of the first function invoker 103 to cloud services, such traffic may be routed to the internet gateway 112 using a public IP address, which in some cases may lead to transmission over the public internet.

Furthermore, due to the second function invoker 103 opting for a private path in this example, when the VM associated with the second function invoker 103 makes a DNS request, the DNS request will be intercepted by the DNS resolver 206 within the endpoint manager 106. The DNS resolver may then determine that the second function invoker 103 opted for a private path and then send a response (e.g., to the VM) with DNS entries which may have the IP address of the private path (e.g., the VPC endpoint 110). The VM may then associate the IP address of the private path with traffic leaving the VM. As such, when the VM routes traffic of the second function invoker 103 to cloud services, such traffic may be routed to the VPC endpoint 110 which may be a secure or private path (e.g., entirely within the cloud provider network 100 infrastructure via a private IP address not visible to the public internet, such as via network 105).

Figure 3:
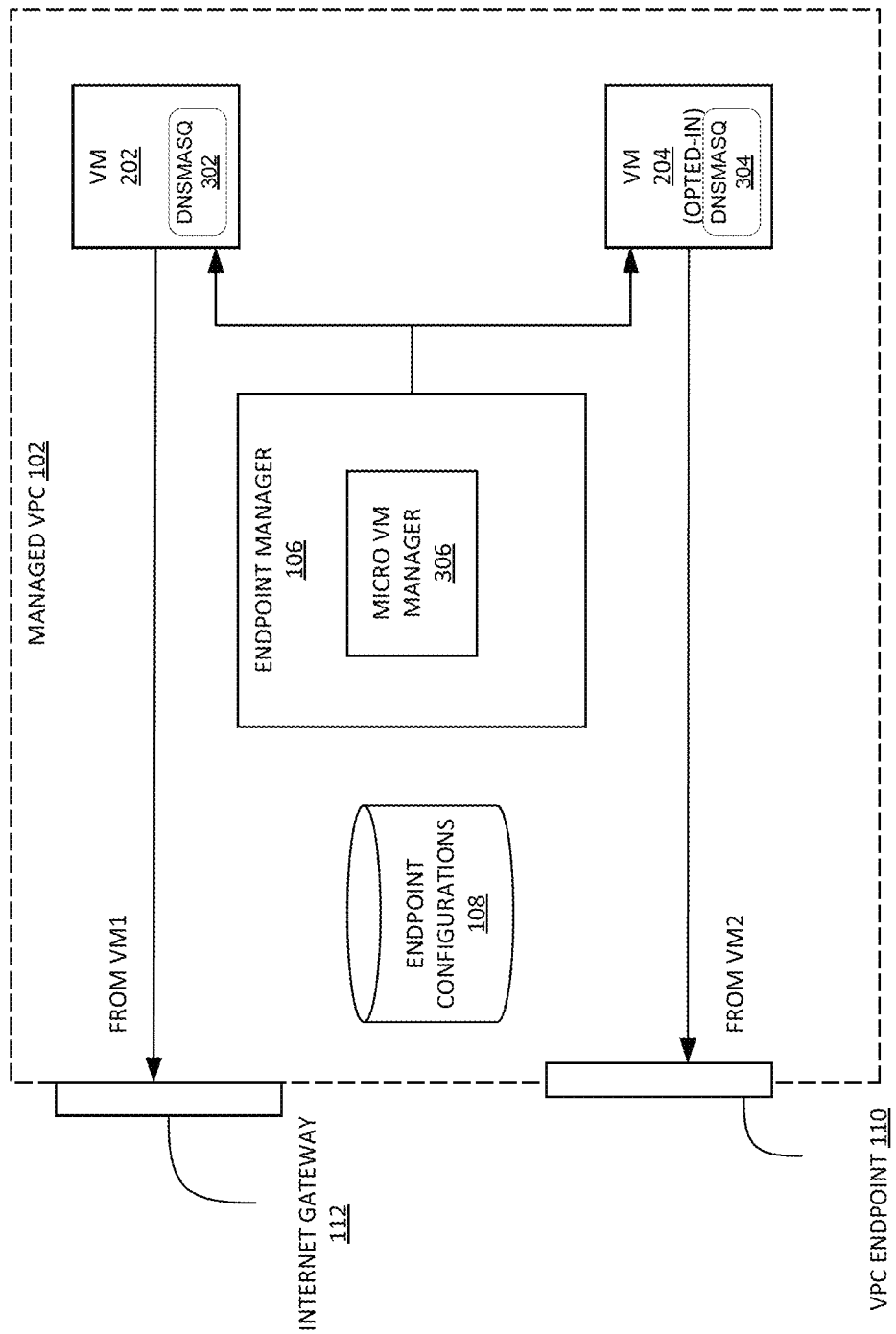
FIG. 3 is a block diagram of a managed VPC where communications from functions invoked via the on-demand code execution system can be routed securely to cloud services by use of a local DNS server according to some embodiments.

FIG. 3 is a block diagram of a managed VPC 102 where communications from functions invoked via the on-demand code execution system 120 can be routed securely to cloud services by use of a local DNS server according to some embodiments. In some embodiments, as shown, the managed VPC 102 includes an endpoint manager 106, a micro VM manager 306, and endpoint configurations data store 108.

As shown in FIG. 3, the endpoint manager 106 can use a micro VM manager 306 to inject DNS entries (e.g., with associated IP addresses for routing traffic) into a local DNS server or DNS cache on VMs associated with function invokers 103 to ensure traffic associated with an invoked function is sent over a private path (e.g., via a private IP address so that the traffic remains entirely within the cloud provider network 100 infrastructure, such as via network 105). This injection of DNS entries may be performed during setup and/or creation of a VM for a function invoker 103 and may be based on whether the function invoker 103 opts for a private path when communicating with cloud services. The injection of DNS entries can result in traffic from the VM being routed to an IP address associated with the DNS entries. For example, a first function invoker 103 associated with VM 202 may have opted out of (or not opted into) a private path and a second function invoker 103 associated with VM 204 may have opted in to (or not opted out of) a private path, when communicating with cloud services (e.g., VPC cloud storage 114 and VPC cloud analytics 116) for their function-initiated traffic. The opt-out and the opt-in settings of the VM 202 and the VM 204, respectively, can be stored in the endpoint configurations data store 108 such that the endpoint manager 106 may retrieve these settings when needed.

As illustrated in FIG. 3, due to the first function invoker 103 associated with the VM 202 opting out of having a private path in this example (e.g., when the micro VM manager 306 references the endpoint configurations data store 108 to determine this), the endpoint manager 106 may utilize the micro VM manager 306 to inject DNS entries (e.g., with an IP address of the internet gateway 112, a public IP address) into a local DNS server of the VM 202. For example, the local DNS server may be a dnsmasq 302 running on the VM 202 where the dnsmasq may accept DNS entry injection to assist in routing traffic for the VM 202. This injection may occur when such VM was created and/or configured for the first function invoker 103 (where the DNS entries contain the IP address of the internet gateway 112 and that IP address is assigned to the dnsmasq of VM 202). Therefore, once the micro VM manager 306 injects the dnsmasq 302 with DNS entries, the traffic coming from VM 202 may be routed to the internet gateway 112. As such, when a function is invoked on the VM 202, the traffic associated with that VM may be routed (e.g., via the dnsmasq 302) to the IP address of the internet gateway 112 (e.g., a public IP address).

Moreover, due to the second function invoker 103 associated with the VM 204 opting for a private path in this example (e.g., when the micro VM manager 306 references the endpoint configurations data store 108 to determine this), the endpoint manager 106 may utilize the micro VM manager 306 to inject DNS entries (e.g., with a private IP address of the VPC endpoint 110) into a local DNS server of the VM 204. The local DNS server may be a dnsmasq 304 running on the VM 204 where the dnsmasq 304 may accept DNS entry injection to assist in routing traffic for the VM 204. This injection may occur when such VM was created and/or configured for the first function invoker 103 (where the DNS entries contain the IP address of the VPC endpoint 110 and that IP address is assigned to the dnsmasq of VM 204). Therefore, once the micro VM manager 306 injects the dnsmasq 304 with DNS entries, the traffic coming from VM 204 may be routed to the VPC endpoint 110. As such, when a function is invoked on the VM 204, the traffic associated with that VM may be routed (e.g., via the dnsmasq 304) to the IP address of the VPC endpoint 110 (e.g., a private path using SSL).

Figure 4:
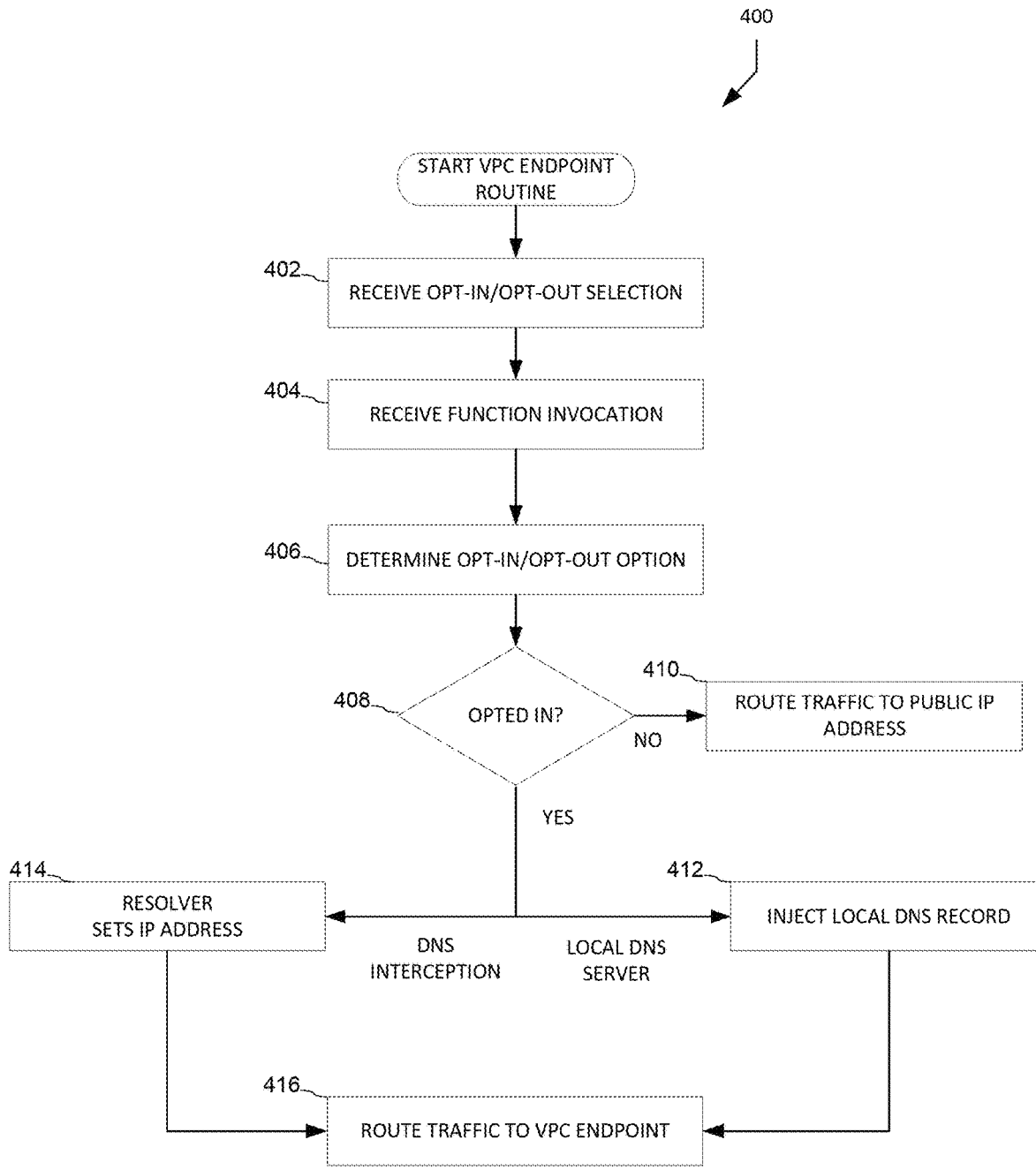
FIG. 4 is a flow diagram of an illustrative routine for an on-demand code execution system to determine whether to route traffic from an invoked function through a private path based on whether the function invoker or function owner has opted in to use of private paths according to some embodiments.

FIG. 4 is a flow diagram of an illustrative routine 400 for an on-demand code execution system 120 to determine whether to route traffic from an invoked function through a private path based on whether the function invoker or function owner has opted in to use of secure connections according to some embodiments.

The routine 400 begins at block 402. At block 402, the managed VPC 102 receives opt-in or opt-out information from function invokers 103. As stated herein, if a function invoker 103 opts in (or, in some embodiments, does not opt out), the managed VPC 102 may designate that any function-initiated traffic is routed to a private path (e.g., the VPC endpoint 110). On the other hand, if a function invoker 103 opts out (or, in some embodiments, does not opt in), the managed VPC 102 may designate that function-initiated traffic may be routed using a public IP address (e.g., through an internet gateway 112 with access to the public internet 101). The opt-in or opt-out information may be stored in the endpoint configurations data store 108. Moreover, as also described herein, the managed VPC 102 may utilize either a DNS resolver or a local DNS server (e.g., using a dnsmasq) to implement a private path for routing function-initiated traffic.

At block 404, the managed VPC 102 receives a function invocation from a function invoker 103. The function invocation can be associated with traffic that is destined for cloud services (e.g., the VPC cloud storage 114 and/or the VPC cloud analytics 116, AI cloud services, etc.) which requires traversal through one or more networks (e.g., the networks 104 and/or 105).

At block 406, the endpoint manager 106 of the managed VPC 102 may determine (e.g., via the endpoint configurations data store 108) whether the function invoker 103 opted in or opted out of a private path for its function-initiated traffic. It should be noted that in some instances (e.g., using a dnsmasq), a determination of whether the function invoker 103 opted in may be performed prior to any function-initiated traffic being generated (e.g., when a VM instance is created, configured, and/or generated), as is described in detail herein.

At decision 408, if the function invoker 103 opted out of having a private path, the managed VPC 102 may assign an IP address of a public IP address path through an internet gateway at block 410. As described herein, this may be accomplished by a local DNS server associated with a VM instance of the function-initiated or by use of a DNS resolver which may intercept DNS requests.

Still at decision 408, if the function invoker 103 opted in to having a private path, the managed VPC 102 may ensure a private IP address of a private path is assigned to function-initiated traffic.

At block 412, if the managed VPC 102 is implemented using a local DNS server, then the micro VM manager 306 may inject DNS entries of a private IP address associated with a private path into the VM, or a component of the VM (e.g., into a local DNS server, into DNS cache, or into a dnsmasq), of the function invoker 103.

At block 414, if the managed VPC 102 is implemented using a DNS resolver 206, then the DNS resolver 206 may be configured to intercept DNS requests associated with the function-initiated traffic and return a private IP address associated with a private path (e.g., the VPC endpoint 110) such that the sender (e.g., VM of the function invoker 103) may receive the IP address and assign it traffic leaving the VM of the function invoker 103.

At block 416, the managed VPC 102 routes the function-initiated traffic to a VPC endpoint which is a private path.

Example Endpoint Manager System

Figure 5:
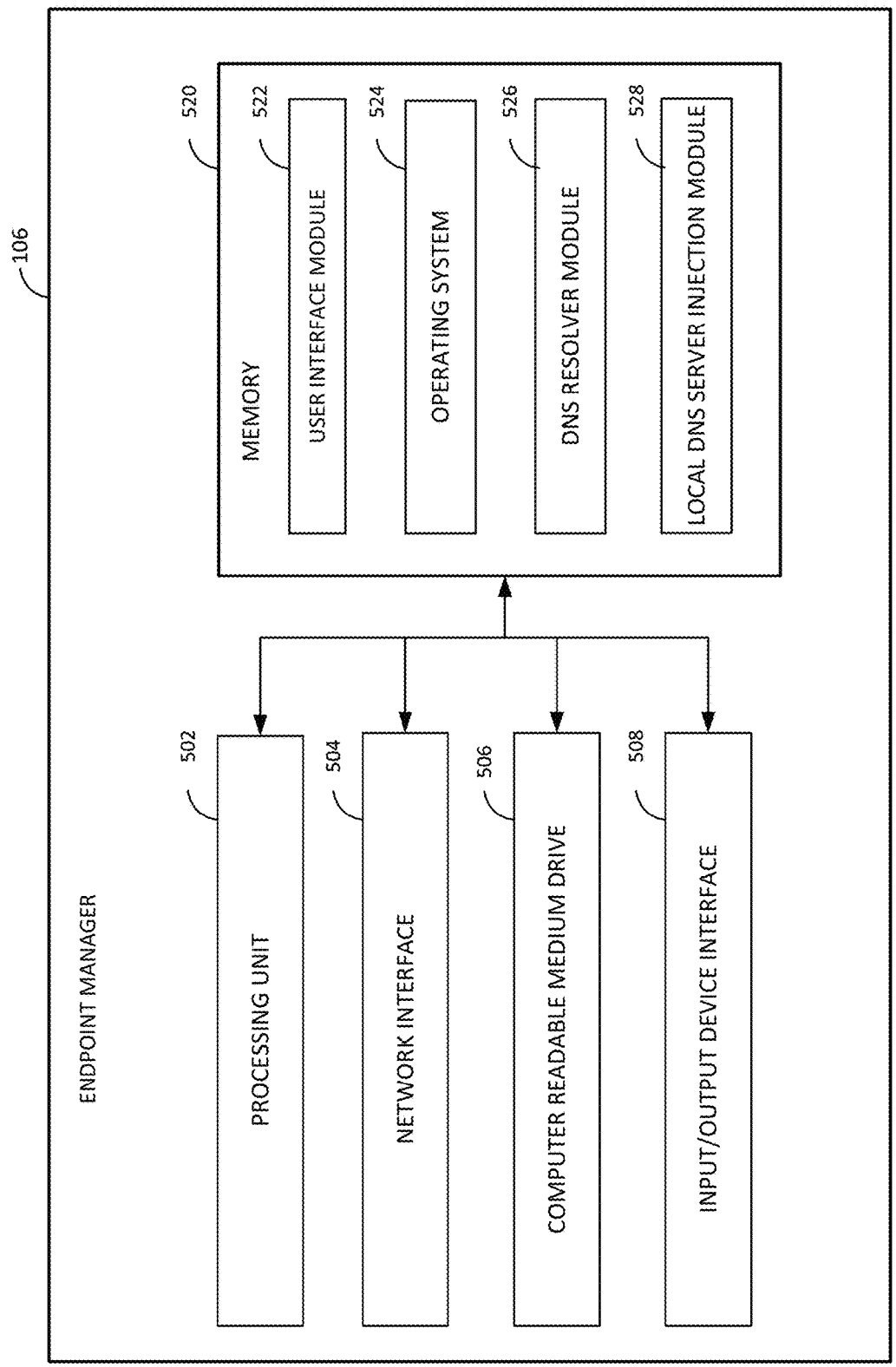
FIG. 5 depicts a general architecture of a computing device configured to implement the endpoint manager of FIG. 1 according to some embodiments.

FIG. 5 illustrates various components of an example endpoint manager configured to implement various functionality described herein.

In some embodiments, as shown, an endpoint manager 106 may include: one or more computer processors 502, such as physical central processing units (CPUs); one or more network interfaces 504, such as a network interface cards (NICs); one or more computer readable medium drives 506; and one or more input and output device interfaces 508.

The primary memory 520 may include computer program instructions that one or more computer processors 502 execute and/or data that the one or more computer processors 502 use in order to implement one or more embodiments. For example, the primary memory 520 can store a user interface module 522 and an operating system 524 to provide general administration of the endpoint manager 106. As another example, the primary memory 520 can store DNS resolver module 526 for storing coding and configuration for defining a DNS resolver that determines whether traffic should be routed to a private path. As a further example, the primary memory 520 can store a local DNS server injection module 528 for defining procedure to inject DNS entries into virtual execution environments.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a cloud provider network in communication with a public internet;
   an on-demand code execution service comprising a first set of one or more computing devices within a virtual private cloud of the cloud provider network, wherein the on-demand code execution service is configured to provide on-demand execution of function code;
   a plurality of network-based services comprising a second set of one or more computing devices configured to provide computing services via both the cloud provider network and the public internet; and
   an endpoint manager configured to provide an opt-in option for a private path to the plurality of network-based services via private internet protocol (IP) addresses not accessible via the public internet, wherein the endpoint manager comprises a third set of one or more computing devices configured to:
      receive, from a function invoker, a first request to opt-in to the private path for communications from functions invoked by the function invoker on the on-demand code execution service;
      receive, from the function invoker, a second request to invoke a function;
      determine, based on the first request to opt-in to the private path, that all communications initiated by the invoked function to a network-based service of the plurality of network-based services are to remain within the cloud provider network until the communications reach the network-based service via the private IP addresses; and
      configure the on-demand code execution service to:
         execute code associated with the invoked function within a virtual execution environment of the on-demand code execution service; and
         route a communication, initiated by the invoked function executing in the virtual execution environment and destined for the network-based service, to a virtual private cloud endpoint associated with the on-demand code execution service, wherein the virtual private cloud endpoint is configured to route the communication to the network-based service only via the private IP addresses such that the communication does not travel over the public internet.

2. The system of claim 1, wherein the endpoint manager is further configured to:
intercept a domain name system (DNS) request initiated by the invoked function for an IP address to which the communication destined for the network-based service is to be sent; and
reply to the DNS request with an IP address of the virtual private cloud endpoint associated with one of the private IP addresses.

3. The system of claim 2, wherein the endpoint manager is further configured to:
intercept a second DNS request, initiated by a second function invoked by a second function invoker, for a second IP address to which a second communication destined for the network-based service is to be sent; and
reply to the second DNS request with an IP address of an internet gateway to a public IP address based on the second function invoker opting-out of the private path.

4. The system of claim 1, wherein the endpoint manager is further configured to inject a domain name system (DNS) record into the virtual execution environment, wherein the DNS record associates the network-based service with an IP address of the virtual private cloud endpoint.

5. A computer-implemented method comprising:
under control of an on-demand code execution system hosted within a cloud provider network in communication with a public internet, the on-demand code execution system comprising one or more computer processors configured to execute specific instructions:
receiving an opt-in request to opt-in to use a private communication path within the cloud provider network for traffic initiated by a function;
subsequent to receiving the opt-in request, receiving a function invocation request to invoke the function, wherein the function is configured to send one or more communications to a network-based service hosted within the cloud provider network and external to the on-demand code execution system;
providing, to a virtual execution environment configured to execute the function, a mapping of the network-based service to an internet protocol (IP) address of a private endpoint associated with the on-demand code execution system, wherein the private endpoint is configured to route network traffic within the cloud provider network using only one or more private IP addresses of the cloud provider network, and wherein the public internet is inaccessible via the private endpoint; and
causing execution of the function by the virtual execution environment, wherein a network communication to the network-based service initiated by the function is sent to the private endpoint based on the mapping of the network-based service to the IP address.

6. The computer-implemented method of claim 5, wherein receiving the opt-in request comprises receiving the opt-in request from one of: a function owner of the function, or a function invoker of the function.

7. The computer-implemented method of claim 5, further comprising storing an opt-in record regarding the opt-in request in an endpoint configurations data store, wherein the opt-in record specifies the function and the network-based service to which communications initiated by the function are to be communicated over the private communication path.

8. The computer-implemented method of claim 5, further comprising storing an opt-in record regarding the opt-in request in an endpoint configurations data store, wherein the opt-in record specifies that all communications initiated by the function are to be communicated over the private communication path.

9. The computer-implemented method of claim 5, wherein providing, to the virtual execution environment, the mapping of the network-based service to the IP address of the private endpoint comprises providing a mapping record to a local domain name system (DNS) server in the virtual execution environment.

10. The computer-implemented method of claim 5, further comprising routing a second communication initiated by the function to a second network-based service through an internet gateway using a public IP address accessible via the public internet.

11. The computer-implemented method of claim 5, further comprising:
receiving a second function invocation request to invoke a second function, wherein the second function invocation request is received from a same function invoker as the function invocation request, and wherein the opt-in request applies to all network-based services with which functions invoked by the function invoker communicate;
providing, to a second virtual execution environment configured to execute the second function, the mapping of the network-based service to the IP address of the private endpoint; and
causing execution of the second function by the second virtual execution environment, wherein a second network communication to the network-based service initiated by the second function is sent to the private endpoint based on the mapping of the network-based service to the IP address.

12. The computer-implemented method of claim 5, further comprising:
receiving a second function invocation request to invoke a second function, wherein the second function invocation request is received from a different function invoker than the function invocation request, and wherein no opt-in request associated with the second function has been received;
configuring a second virtual execution environment to execute the second function in response to the second function invocation request; and
causing execution of the second function by the second virtual execution environment, wherein a second network communication to the network-based service initiated by the second function is sent using a public IP address accessible via the public internet.

13. A computer-implemented method comprising:
under control of an on-demand code execution system hosted within a cloud provider network in communication with a public internet, the on-demand code execution system comprising one or more computer processors configured to execute specific instructions:
receiving an opt-in request to opt-in to use a private communication path within the cloud provider network for traffic initiated by a function;
subsequent to receiving the opt-in request, receiving a function invocation request to invoke the function, wherein the function is configured to send one or more communications to a network-based service hosted within the cloud provider network and external to the on-demand code execution system;
causing execution of the function by a virtual execution environment, wherein during execution of the function, a domain name system (DNS) request associated with the network-based service is generated; and providing, to the virtual execution environment in response to the DNS request, a first internet protocol (IP) address of a private endpoint associated with the on-demand code execution system instead of a second IP address by which the network-based service is accessible via the public internet, wherein the private endpoint is configured to route network traffic within the cloud provider network using only one or more private IP addresses of the cloud provider network, and wherein the public internet is inaccessible via the private endpoint.

14. The computer-implemented method of claim 13, wherein receiving the opt-in request comprises receiving the opt-in request from one of: a function owner of the function, or a function invoker of the function.

15. The computer-implemented method of claim 13, further comprising storing an opt-in record regarding the opt-in request in an endpoint configurations data store, wherein the opt-in record specifies the function and the network-based service to which communications initiated by the function are to be communicated over the private communication path.

16. The computer-implemented method of claim 13, further comprising storing an opt-in record regarding the opt-in request in an endpoint configurations data store, wherein the opt-in record specifies that all communications initiated by the function are to be communicated over the private communication path.

17. The computer-implemented method of claim 13, further comprising determining, in response to the DNS request, that the opt-in request has been received.

18. The computer-implemented method of claim 13, further comprising providing, to the virtual execution environment in response to a second DNS request associated with a second network-based service, a second IP address accessible via the public internet.

19. The computer-implemented method of claim 13, further comprising:

receiving a second function invocation request to invoke a second function, wherein the second function invocation request is received from a same function invoker as the function invocation request, and wherein the opt-in request applies to all network-based services with which functions invoked by the function invoker communicate; and causing execution of the second function by a second virtual execution environment, wherein a second network communication to the network-based service initiated by the second function is sent to the private endpoint based on the first IP address.

20. The computer-implemented method of claim 13, further comprising:

receiving a second function invocation request to invoke a second function, wherein the second function invocation request is received from a different function invoker than the function invocation request, and wherein no opt-in request associated with the second function has been received;

configurating a second virtual execution environment to execute the second function in response to the second function invocation request; and causing execution of the second function by the second virtual execution environment, wherein a second network communication to the network-based service initiated by the second function is sent using a public IP address.

\* \* \* \* \*